(12) United States Patent
Mori

(10) Patent No.: US 12,384,886 B2
(45) Date of Patent: Aug. 12, 2025

(54) POROUS POLYIMIDE COMPOSITION AND POLYAMIDE ACID COMPOSITION

(71) Applicant: ASAHI KASEI KABUSHIKI KAISHA, Tokyo (JP)

(72) Inventor: Hirotaka Mori, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 18/116,669

(22) Filed: Mar. 2, 2023

(65) Prior Publication Data

US 2023/0312831 A1 Oct. 5, 2023

(30) Foreign Application Priority Data

Mar. 3, 2022 (JP) ................. 2022-032776
Jan. 12, 2023 (JP) ................. 2023-002978

(51) Int. Cl.
*C08G 73/10* (2006.01)
*C08J 5/18* (2006.01)
*C08J 9/28* (2006.01)

(52) U.S. Cl.
CPC ....... *C08G 73/1078* (2013.01); *C08G 73/101* (2013.01); *C08G 73/1032* (2013.01); *C08J 5/18* (2013.01); *C08J 9/286* (2013.01); C08G 2110/005 (2021.01); C08J 2201/0502 (2013.01); C08J 2205/026 (2013.01); C08J 2379/08 (2013.01)

(58) Field of Classification Search
USPC ....................................................... 428/220
See application file for complete search history.

(56) References Cited

U.S. PATENT DOCUMENTS

| | | |
|---|---|---|
| 9,434,832 B1 | 9/2016 | Meador |
| 10,358,539 B1 | 7/2019 | Meador |
| 10,800,883 B1 * | 10/2020 | Vivod ..................... C08J 9/122 |
| 2010/0144924 A1 | 6/2010 | Yoshiwara et al. |
| 2015/0141544 A1 | 5/2015 | Meador et al. |
| 2019/0058178 A1 | 2/2019 | Meador et al. |
| 2021/0115214 A1 | 4/2021 | Ejaz et al. |
| 2025/0075037 A1 * | 3/2025 | Mori ................. C08G 73/1039 |

FOREIGN PATENT DOCUMENTS

| | | |
|---|---|---|
| CN | 101568567 A | 10/2009 |
| CN | 106928707 A | 7/2017 |
| CN | 108884231 A | 11/2018 |
| CN | 110317353 A | 10/2019 |
| CN | 111253742 A | 6/2020 |
| CN | 108203516 B | 10/2020 |
| JP | 2001-329098 A | 11/2001 |
| JP | 2002-528561 A | 9/2002 |
| JP | 2005-23151 A | 1/2005 |
| JP | 2007-45054 A | 2/2008 |
| JP | 2013049617 A * | 3/2013 |
| WO | WO 00/05297 A1 | 2/2000 |
| WO | WO 2020/162418 A1 | 8/2020 |

OTHER PUBLICATIONS

Machine_English_translation_JP_201349617_A; Inoue, Method for producing activated carbon porous body, activated carbon porous body, and electrode for electric double layer capacitor; Mar. 14, 2013; EPO; whole document (Year: 2024).*
Meador et al., "Mechanically Strong, Flexible Polyimide Aerogels Cross-Linked with Aromatic Triamine", ACS Applied Materials Interfaces, Jan. 10, 2012, vol. 4, No. 2, p. 536-544.
Meador et al., "Polyimide Aerogels with Amide Cross-Links: A Low Cost Alternative for Mechanically Strong Polymer Aerogels", ACS Applied Materials Interfaces, Jan. 7, 2015, vol. 7, No. 2, p. 1240-1249.
Shen et al., "Intrinsically Highly Hydrophobic Semi-alicyclic Fluorinated Polyimide Aerogel with Ultralow Dielectric Constants", Chem. Lett., Jul. 27, 2013, vol. 42, p. 1230-1232.
Vivod et al., "Toward Improved Optical Transparency of Polyimide Aerogels", ACS Applied Materials Interfaces, Jan. 27, 2020, vol. 12, p. 8622-8633.

* cited by examiner

*Primary Examiner* — Tahseen Khan
(74) *Attorney, Agent, or Firm* — Birch, Stewart, Kolasch & Birch, LLP

(57) ABSTRACT

Provided is a porous polyimide composition having low colorability and high light transmittability. Provided is a porous polyimide composition, in which an average pore size (L) obtained by the following expression based on a pore volume (V) and a BET specific surface area (A) determined by a gas adsorption method: $L=4V/A$; is 5 nm or more and 500 nm or less, a light transmittance at 450 nm at a film thickness of 1 mm is 10% or more and 100% or less, and a degree of polymerization (n) is 5 or more and less than 40.

22 Claims, 1 Drawing Sheet

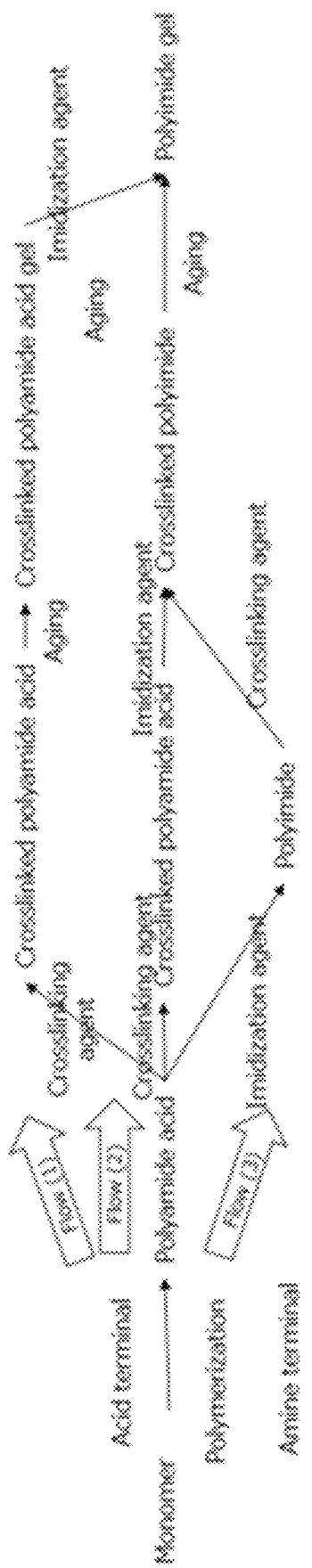

POROUS POLYIMIDE COMPOSITION AND POLYAMIDE ACID COMPOSITION

FIELD

The present invention relates to a porous polyimide composition, and a polyamide acid composition for obtaining the porous polyimide composition.

BACKGROUND

Aerogels, while have been conventionally defined as porous substances obtained by replacement of solvents contained in gels with gases by supercritical drying, have been, in recent years, more broadly recognized as porous substances obtained by removal of solvents from solvent-containing colloid or polymer network forms with suppression of shrinkage, a reduction in volume, and the like. Aerogels have various characteristics such as low density, high porosity, porousness (mesopore), high specific surface area, high specific strength, high heat insulating properties, high electrical insulating properties, and high sound insulating properties, due to fine pore structures thereof. For example, silica aerogels, polymer aerogels such as polyimide aerogels, and carbon aerogels are known as the types of aerogels.

PTLs 1 and 2 each describe a crosslinked polyimide aerogel and a production method thereof. The aerogel has a crosslinked polyamide formed with a triacid chloride crosslinking agent. The aerogel includes a polyimide oligomer component and the crosslinked polyamide, in which the crosslinked polyamide is bound to the polyimide oligomer component, and the polyimide oligomer component includes a reaction product of diamine and acid dianhydride, at a proportion of (n+1):n (n represents the number of repeating units in the oligomer).

PTL 3 describes a method for producing a polyimide aerogel. The Literature indicates that the polyimide aerogel can be improved in transparency by appropriate adjustment of the proportions of pyromellitic anhydride and 4,4'-hexafluoroisopropylidene diphthalic anhydride (6FDA) as aromatic acid dianhydrides relative to diamine such as 2,2'-dimethyl-4,4'-benzidine.

NPL 1 describes a method for producing a polyimide aerogel from an amine-capped oligomer crosslinked with 1,3,5-benzenetricarbonyl chloride (BTC). The Literature indicates that an aerogel brand made according to the method has a comparable or more elastic modulus and a higher surface area than one having the same density as those of crosslinking of, for example, 1,3,5-tris(4-aminophenoxy)benzene (TAPB) and octa (aminophenoxy) silsesquioxane (OAPS), previously reported.

NPL 2 describes a polyimide aerogel improved in transparency and a production method thereof. The Literature indicates that the polyimide aerogel can be improved in transparency by appropriate adjustment of the proportions of pyromellitic anhydride and 4,4'-hexafluoroisopropylidene diphthalic anhydride (6FDA) relative to 2,2'-dimethyl-4,4'-benzidine.

NPL 3 describes a polyimide aerogel using an alicyclic acid anhydride, and a production method thereof. The Literature indicates that a polyimide aerogel where a polyimide made of 1,2,3,4-cyclobutane tetracarboxylic anhydride (CBDA) and 2,2'-bis(trifluoromethyl)-4,4'-benzidine (TFMB) is crosslinked with octa (aminophenyl) silsesquioxane (OAPS) exhibits high hydrophobicity and low dielectric characteristics.

NPL 4 describes a method for producing a nanoporous polyimide aerogel. The method includes crosslinking a polyamine acid oligomer capped with an anhydride, with an aromatic triamine in a solution, for chemical imidization, to thereby obtain a polyimide gel, and supercritically drying the gel to thereby obtain a nanoporous polyimide aerogel.

CITATION LIST

Patent Literature

[PTL 1] U.S. Pat. No. 9,434,832
[PTL 2] U.S. Pat. No. 10,358,539
[PTL 3] U.S. Pat. No. 10,800,883

Non Patent Literature

[NPL 1] Mary Ann B. Meador, et al., "Polyimide Aerogels with Amide Cross-Links: A Low Cost Alternative for Mechanically Strong Polymer Aerogels", ACS Appl. Mater. Interfaces, (2015), 7 (2), 1240-1249

[NPL 2] Stephanie L. Vivod, et al., "Toward Improved Optical Transparency of Polyimide Aerogels", ACS Appl. Mater. Interfaces, (2020), 12, 8622-8633

[NPL 3] Dengxiong Shen, et al., "Intrinsically Highly Hydrophobic Semi-alicyclic Fluorinated Polyimide Aerogel", Chem. Lett., (2013), 42, 1230-1232

[NPL 4] Mary Ann B Meador, et al., "Mechanically strong, flexible polyimide aerogels crosslinked with aromatic triamine", ACS Appl. Mater. Interfaces, (2012), 4 (2), pp. 536-544

SUMMARY

Technical Problem

The polyimide aerogels described in PTLs 1 and 2, and NPL 1 are each remarkably colored yellow to orange due to an aromatic polyimide structure. The polyimide aerogels are each considered to have a pore structure (macropore) causing diffuse reflection of light, and are each low in light transmittability.

The polyimide aerogel described in NPL 2 is also remarkably colored yellow to orange due to an aromatic polyimide structure, as in NPL 1.

The polyimide aerogel described in NPL 3 is small in colorability of a polyimide skeleton by itself because an alicyclic acid dianhydride is used. On the other hand, the polyimide aerogel is considered to have a pore structure (macropore) causing diffuse reflection of light, as in NPLs 1 and 2, and is a white opaque aerogel.

The procedures described in PTL 3 and NPL 4 each have a difficulty in obtaining a polyimide aerogel having low colorability and high light transmittability.

One object of the present disclosure is to provide a porous polyimide composition having low colorability and high light transmittability, and a polyamide acid composition for obtaining the porous polyimide composition.

Solution to Problem

Examples of embodiments of the present disclosure are recited below.

[1]

A porous polyimide composition, wherein
an average pore size (L) obtained by the following expression based on a pore volume (V) and a BET specific surface area (A) determined by a gas adsorption method:

$$L=4V/A$$

is 5 nm or more and 500 nm or less,
a light transmittance at 450 nm at a film thickness of 1 mm is 10% or more and 100% or less, and
a degree of polymerization (n) is 5 or more and less than 40.

[2]

The porous polyimide composition according to Item 1, wherein
respective ratios of amounts of adsorption at relative pressures of 0.90, 0.85, 0.80, and 0.75 to an amount of adsorption at a relative pressure of 0.98 in a desorption curve in a nitrogen adsorption/desorption isotherm at 77 K are 0.50 or more and 1.0 or less, 0.30 or more and 1.0 or less, 0.25 or more and 0.90 or less, and 0.20 or more and 0.85 or less.

[3]

The porous polyimide composition according to Item 1 or 2, having a crosslinked polyimide structure obtained by crosslinking of polyamide acid obtained by polymerization of tetracarboxylic dianhydride and diamine at a ratio of n+1:n.

[4]

The porous polyimide composition according to any one of Items 1 to 3, wherein a minimum value of a light transmittance between 400 nm and 700 nm at a film thickness of 1 mm is 5% or more.

[5]

The porous polyimide composition according to any one of Items 1 to 4, wherein a difference between a maximum value and a minimum value of a light transmittance between 400 nm and 700 nm at a film thickness of 1 mm is 1% or more and 80% or less.

[6]

The porous polyimide composition according to any one of Items 1 to 5, wherein an average value of a light transmittance between 400 nm and 700 nm at a film thickness of 1 mm is 30% or more and 100% or less.

[7]

The porous polyimide composition according to any one of Items 1 to 6, wherein a bulk density is 0.05 g/cm$^3$ or more and 0.50 g/cm$^3$ or less.

[8]

The porous polyimide composition according to any one of Items 1 to 7, wherein a strain at break in a three-point bending test is 5% or more.

[9]

The porous polyimide composition according to any one of Items 1 to 8, wherein a bending strength in a three-point bending test is 5 MPa or more.

[10]

The porous polyimide composition according to any one of Items 1 to 9, wherein a bending elastic modulus in a three-point bending test is 50 MPa or more.

[11]

The porous polyimide composition according to any one of Items 1 to 10, wherein a BET specific surface area after heat treatment at 200° C. for 1 hour is 10 m$^2$/g or more and 2,000 m$^2$/g or less.

[12]

The porous polyimide composition according to any one of Items 1 to 11, having a sheet shape.

[13]

The porous polyimide composition according to Item 12, wherein an average thickness is 10 mm or less.

[14]

The porous polyimide composition according to any one of Items 1 to 13, wherein, when a light transmittance at 450 nm is defined as LT [%] and a thickness is defined as T [mm], a relationship represented by the following expression:

$$0<(100-LT)/T\leq70$$

is satisfied.

[15]

The porous polyimide composition according to any one of Items 1 to 14, wherein a polyimide constituting the porous polyimide composition has a polyimide main skeleton and a crosslinked structure that crosslinks the polyimide main skeleton.

[16]

The porous polyimide composition according to Item 15, wherein the crosslinked structure is a structure with a tri- or higher-valent group derived from a monocyclic or polycyclic aromatic ring optionally substituted, or a tri- or higher-valent group derived from a linked aromatic ring where a plurality of aromatic rings optionally substituted are linked to each other by direct binding or by binding via a hetero atom.

[17]

The porous polyimide composition according to Item 15, wherein the polyimide main skeleton has a molecular chain represented by the following general formula (1):

[Chem. 1]

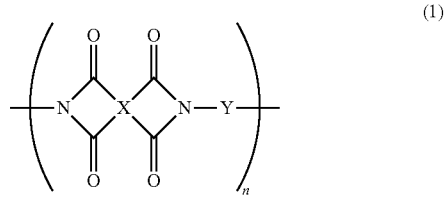

wherein X and/or Y have/has a structure containing an alicycle, and n is a degree of polymerization of the polyimide.

[18]

The porous polyimide composition according to any one of Items 1 to 17, wherein
a polyimide constituting the porous polyimide composition comprises a polymerization product of a polymerization component comprising a tetracarboxylic dianhydride, a diamine, and a tri- or higher-functional amine, and
a ratio of the tri- or higher-functional amine based on 100% by mass in total of the tetracarboxylic dianhydride, the diamine and the tri- or higher-functional amine is 1% by mass or more and 40% by mass or less.

[19]

The porous polyimide composition according to any one of Items 1 to 18, comprising a polymerization product of a polymerization component comprising a tetracarboxylic dianhydride, a diamine, and a tri- or higher-functional amine in a polyimide constituting the porous polyimide composition, wherein a ratio of the tetracarboxylic dianhydride, including an aromatic ring, based on 100% by mass in total of the tetracarboxylic dianhydride is less than 50% by mass, and/or a ratio of the diamine, including an aromatic ring, based on 100% by mass in total of the diamine is less than 50% by mass.

[20]

The porous polyimide composition according to any one of Items 1 to 17, for use in a heat-resistant material low in coloration and high in light transmission.

[21]

A polyamide acid composition that comprises a resin precursor and a solvent and that is for obtaining a heat-resistant material low in coloration and high in light transmission, wherein a porous polyimide composition obtained by subjecting the polyamide acid composition to addition of a cross-linking agent and chemical imidization due to immersion in a solution in the listed order satisfies the following (1) to (2):

(1) an average pore size (L) obtained by the following expression based on a pore volume (V) and a BET specific surface area (A) determined by a gas adsorption method:

$$L=4V/A$$

is 5 nm or more and 500 nm or less,
(2) a light transmittance at 450 nm at a film thickness of 1 mm is 10% or more, and a degree of polymerization (n) of the polyimide is 5 or more and less than 40.

Advantageous Effects of Invention

According to the present disclosure, a porous polyimide composition having low colorability and high light transmittability, and a polyamide acid composition for obtaining the porous polyimide composition can be provided.

BRIEF DESCRIPTION OF THE DRAWINGS

The FIGURE illustrates a flow of producing a porous polyimide of the present disclosure.

DESCRIPTION OF EMBODIMENTS

Hereinafter, one embodiment of the present invention (hereinafter, abbreviated as "embodiment") is described in detail. The present invention is not limited to the following embodiment, and can be variously modified and carried out within the gist thereof.

In the following description, the upper limit value or the lower limit value in a numerical value range stepwisely described may be replaced with the upper limit value or the lower limit value in other numerical value range stepwisely described. In the following description, the upper limit value or the lower limit value in a certain numerical value range may be replaced with values described in Examples. Furthermore, the term "step" in the following description can encompass not only an independent step, but also a step that achieves the function of the "step" even if not clearly distinguishable from other step.

<<Porous Polyimide Composition>>

One aspect of the present invention provides a porous polyimide composition constituted by polyimide (hereinafter, sometimes simply referred to as "porous polyimide"). The porous polyimide includes polyimide in a typical aspect, and may include any component other than the polyimide as long as the effects of the present invention are not impaired. In a porous polyimide according to one aspect, an average pore size (L) obtained by the following expression based on a pore volume (V) and a BET specific surface area (A) determined by a gas adsorption method:

$$L=4V/A$$

is 5 nm or more and 500 nm or less,
a light transmittance at 450 nm at a film thickness of 1 mm is 10% or more and 100% or less, and
a degree of polymerization (n) is 5 or more and less than 40.

In one aspect, the porous polyimide has a sheet shape. The thickness of the sheet is not limited, and, in one aspect, the average thickness may be 10 mm or less, or 8 mm or less, or 5 mm or less, or 3 mm or less, or 1 mm or less, or 500 µm or less, or 400 µm or less, or 300 µm or less, and, in one aspect, may be 0.1 µm or more. The porous polyimide, which has a sheet shape, particularly a sheet shape having an average thickness of 10 mm or less, can be applied as an aerogel sheet to various applications, for example, a thermal insulating material, a low-dielectric material, and a filter material. Alternatively, the average thickness of the sheet may be more than 10 mm, and the porous polyimide may have a bulk shape.

In one aspect, the porous polyimide is for use in a heat-resistant material low in coloration and high in light transmission. Such a porous polyimide is efficiently transparent to visible light (in one aspect, light at wavelengths of 400 nm to 700 nm), and thus is suitable for, for example, an optical material (window glass or the like), a coating material, an interlayer material and a covering material, in a field where heat resistance is demanded, for example, the aeronautical field and the vehicle field. Alternatively, a porous polyimide according to one aspect can also be a material that is low in coloration and high in light transmission and that is at least one material selected from the group consisting of a highly electrical insulating material, a highly soundproof material, and a highly thermal insulating material. Alternatively, a porous polyimide according to one aspect can also be a material that is low in coloration and high in light transmission and that is a high-strength material.

The "colorability" and the "transparency" are not critically the same concepts. The colorability relates to, for example, charge transfer or interaction between an aromatic diamine moiety and an aromatic acid anhydride moiety. The "transparency" relates to, for example, scattering of visible light (in one aspect, light at wavelengths of 400 nm to 700 nm) in the porous polyimide. A porous polyimide according to one aspect has low colorability and high light transmittability as confirmed in Examples. The "colorability" and the "light transmittability" at levels confirmed in Examples correspond to "low colorability" and "high light transmittability" particularly suitable in the above applications.

In one aspect, the light transmittance at 450 nm at a film thickness of 1 mm, of the porous polyimide, is 10% or more and 100% or less. The light transmittance falling within the above range means an aspect that allows low colorability and high light transmittability to be more suitably exhibited. The light transmittance is, in one aspect, preferably 15% or more, 17.5% or more, or 20% or more. The light transmittance may be, in one aspect, 50% or more, or 60% or more. The "light transmittance at a film thickness of 1 mm" here mentioned is a light transmittance in the case where the average thickness is 1 mm or in the case where the average thickness is assumed to be 1 mm.

In one aspect, the minimum value of the light transmittance between 400 nm and 700 nm at a film thickness of 1 mm, of the porous polyimide, is 5% or more. The minimum value falling within the above range means that the porous polyimide has certain levels of low colorability and light transmittability in the region of visible light (in one aspect, light at wavelengths of 400 nm to 700 nm), regardless of the shape and/or film thickness thereof. The minimum value is, in one aspect, preferably 7% or more, 10% or more, or 15% or more.

In one aspect, the difference between the maximum value and the minimum value of the light transmittance between 400 nm and 700 nm at a film thickness of 1 mm, of the porous polyimide, is 1% or more. The difference falling within the above range means that the variation in low colorability and the variation in light transmittability of the porous polyimide are small in the region of visible light (in one aspect, light at wavelengths of 400 nm to 700 nm). The difference is, in one aspect, preferably 1% or more, 5% or more, or 10% or more, and is preferably 90% or less, 85% or less, or 80% or less. The difference may be 70% or less.

In one aspect, the average value of the light transmittance between 400 nm and 700 nm at a film thickness of 1 mm, of the porous polyimide, is 30% or more and 100% or less. The average value falling within the above range means that the porous polyimide has low coloration and light transmission in the entire region of visible light (in one aspect, light at wavelengths of 400 nm to 700 nm). The average value is, in one aspect, preferably 35% or more, 40% or more, or 45% or more. The average value of the light transmittance can be determined as the average of the light transmittances at respective wavelengths in the set wavelength range from 400 nm to 700 nm.

In one aspect, the degree of polymerization (n) of the porous polyimide is 5 or more and less than 40. The degree of polymerization (n) is also associated with "low colorability" and "high light transmittability". The degree of polymerization (n) is preferably 30 or less, 25 or less, or 20 or less from the viewpoint of low colorability and high light transmittability.

A too low degree of polymerization (n), namely, a too high degree of crosslinking causes a too short time until gelation of a polyamide acid solution, thereby easily making it difficult to form a gel into a desired shape. On the other hand, a too high degree of polymerization (n), namely, a too low degree of crosslinking makes it difficult to sufficiently obtain physical strength of the resulting polyamide acid wet gel, and thus there is a tendency to provide no gelation or cause the resulting gel to be brittle and hardly handled. Accordingly, the degree of polymerization (n) falls within the above range, and thus, when polyamide acid is crosslinked to obtain a polyamide acid wet gel, both a gelation time and a sufficient physical strength in handling of the resulting wet gel are easily achieved.

In one aspect, in the porous polyimide, the respective ratios of the amounts of adsorption at relative pressures of 0.90, 0.85, 0.80, and 0.75 to the amount of adsorption at a relative pressure of 0.98 in a desorption curve in a nitrogen adsorption/desorption isotherm at 77 K are 0.50 or more and 1.0 or less, 0.30 or more and 1.0 or less, 0.25 or more and 0.90 or less, and 0.20 or more and 0.85 or less. Satisfaction of such ratios means easy realization of a structure leading to diffuse reflection of visible light or a structure low in contribution of pores, namely, contributes to a high transparency of the porous polyimide. The respective ratios of the amounts of adsorption at relative pressures of 0.90, 0.85, 0.80, and 0.75 to the amount of adsorption at a relative pressure of 0.98 are more preferably 0.55 or more and 1.0 or less, 0.35 or more and 1.0 or less, 0.30 or more and 0.90 or less, and 0.20 or more and 0.80 or less, and the respective ratios of the amounts of adsorption at relative pressures of 0.90, 0.85, 0.80, and 0.75 to the amount of adsorption at a relative pressure of 0.98 are further preferably 0.60 or more and 1.0 or less, 0.40 or more and 1.0 or less, 0.35 or more and 0.90 or less, and 0.25 or more and 0.80 or less, from the viewpoint of low colorability and high light transmittability.

The shape of a pore size is considered as follows.

In a conventional art involving loading a crosslinking agent having an electrophilic functional group, such as an acid chloride or an acid anhydride, to a polyamide acid not gelated, it has been possible to react a side chain of the polyamide acid and the electrophilic functional group of the crosslinking agent to thereby generate a side-chain-crosslinked gel. Such a gel causes an uneven pore structure. On the other hand, the present embodiment where such an uneven pore structure is avoided easily realizes the above pore structure.

In one aspect, when the light transmittance at 450 nm is defined as LT [%] and the thickness is defined as T [mm], the porous polyimide satisfies a relationship represented by the following expression:

$$0<(100-LT)/T\leq 70.$$

The porous polyimide, which satisfies the relationship, is efficiently easily transparent to visible light (in one aspect, light at a wavelength of 450 nm) not only in the case of a thin film, but also in the case of a partway thick film, and thus is particularly suitable in the above applications. The relationship is, in one aspect, preferably 0 or more, 1 or more, or 2 or more, preferably 80 or less, 75 or less, or 70 or less.

In a porous polyimide according to one aspect, the average pore size (L) obtained by the following expression based on the pore volume (V) and the BET specific surface area (A) determined by a gas adsorption method:

$$L=4V/A$$

is 5 nm or more and 500 nm or less. The average pore size (L) falling within this range is an index representing a pore size in the submicron order. The present inventors have focused on control of the average pore size (L) to such a pore size in the submicron order, and a porous polyimide according to one aspect, thus obtained, is low in rate of diffuse reflection in the region of visible light (in one aspect, light at wavelengths of 400 nm to 700 nm), as compared with the case of other pore size. The average pore size (L) is, in one aspect, 5 nm or more, or 6 nm or more, or 7 nm or more, or 8 nm or more, or 9 nm or more, or 10 nm or more, and, in one aspect, is 500 nm or less, or 300 nm or less, or 200 nm or less, or 100 nm or less, or 50 nm or less, or 30 nm or less, or 20 nm or less.

In one aspect, the BET specific surface area of the porous polyimide is 10 m$^2$/g or more and 2,000 m$^2$/g or less. The BET specific surface area falling within the above range is also an index representing a pore size in the submicron order. The BET specific surface area is, in one aspect, 10 m$^2$/g or more, or 50 m$^2$/g or more, or 100 m$^2$/g or more, or 200 m²/g or more, or 300 m²/g or more, and is, in one aspect, 2,000 m²/g or less, or 1,500 m²/g or less, or 1,000 m²/g or less, or 800 m²/g or less.

In one aspect, the BET specific surface area after heat treatment at 200° C. for 1 hour, of the porous polyimide, is 10 m²/g or more and 2,000 m²/g or less. The BET specific surface area falling within the above range means that the porous polyimide keeps a pore structure after the heat treatment. The BET specific surface area is, in one aspect, 10 m²/g or more, or 50 m²/g or more, or 100 m²/g or more, or 200 m²/g or more, or 300 m²/g or more, and is, in one aspect, 2,000 m²/g or less, or 1,500 m²/g or less, or 1,000 m²/g or less, or 800 m²/g or less.

In one aspect, the bending elastic modulus in a three-point bending test of the porous polyimide is 50 MPa or more. The bending elastic modulus falling within the above range has the advantage of enabling the porous polyimide to exhibit excellent toughness useful for various applications of aerogel. The bending elastic modulus is, in one aspect, 100 Mpa or more, 150 MPa or more, or 200 MPa or more, or 300 MPa or more, or 400 MPa or more. The upper limit of the bending elastic modulus is not limited, and, in one aspect, may be 1,000 MPa or less from the viewpoint of ease of production of the porous polyimide.

In one aspect, the bending strength in a three-point bending test of the porous polyimide is 5 MPa or more. The bending strength falling within the above range has the advantage of enabling the porous polyimide to exhibit excellent bending resistance useful for various applications of aerogel. The bending strength is, in one aspect, 7 MPa or more, 10 MPa or more, 12 MPa or more, 13 MPa or more, 14 MPa or more, or 15 MPa or more. The upper limit of the bending strength is not limited, and, in one aspect, may be 30 MPa or less from the viewpoint of ease of production of the porous polyimide.

In one aspect, the strain at break in a three-point bending test of the porous polyimide is 5% or more. The strain at break, falling within the above range, has the advantage of enabling the porous polyimide to exhibit excellent flexibility useful for various applications of aerogel. The strain at break is, in one aspect, 6% or more, 8% or more, 10% or more, 11% or more, 12% or more, 13% or more, 14% or more, or 15% or more. The upper limit of the strain at break is not limited, and may be, in one aspect, 50% or less from the viewpoint of ease of production of the porous polyimide. The strain at break can be measured based on a three-point bending test, and can be measured by, for example, a method described in Examples.

In one aspect, the bulk density of the porous polyimide is 0.05 g/cm³ or more and 0.80 g/cm³ or less. The bulk density falling within the above range is also an index representing a pore size in the submicron order. The bulk density is, in one aspect, 0.05 g/cm³ or more, or 0.06 g/cm³ or more, or 0.07 g/cm³ or more, or 0.08 g/cm³ or more, or 0.09 g/cm³ or more, or 0.10 g/cm³ or more, and is, in one aspect, 0.50 g/cm³ or less, or 0.45 g/cm³ or less, or 0.40 g/cm³ or less.

The bulk density after heat treatment at 200° C. for 1 hour, of the porous polyimide, is preferably in the same numerical value range as in the above bulk density from the viewpoint that the porous polyimide favorably keeps a pore structure even after heat treatment. In other words, the bulk density after heat treatment at 300° C. for 1 hour is, in one aspect, 0.05 g/cm³ or more, or 0.06 g/cm³ or more, or 0.07 g/cm³ or more, or 0.08 g/cm³ or more, or 0.09 g/cm³ or more, or 0.10 g/cm³ or more, and is, in one aspect, 0.50 g/cm³ or less, or 0.45 g/cm³ or less, or 0.40 g/cm³ or less.

Examples of the procedure for control of the configuration and characteristics of the porous polyimide to the scope of the present embodiment can include
(1) controlling the molecular structure of the polyimide, and/or
(2) performing gelation before imidization, in production of the polyimide,
but not limited thereto.

<Molecular Structure of Polyimide>

The polyimide constituting the porous polyimide is, in one aspect, a crosslinked polyimide having a polyimide main skeleton and a crosslinked structure that crosslinks the polyimide main skeleton.

In one aspect, the polyimide is a polymerization product of a polymerization component including a tetracarboxylic dianhydride, a diamine, and a tri- or higher-functional amine. The ratio of the tri- or higher-functional amine based on 100% by mass in total of the tetracarboxylic dianhydride, the diamine and the tri- or higher-functional amine is preferably 1% by mass or more or 1.5% by mass or more from the viewpoint that the crosslinking density of the polyimide is in a proper range to thereby obtain a desired pore structure of the porous polyimide, and is preferably 40% by mass or less, or 35% by mass or less, or 30% by mass or less from the same viewpoint.

In one aspect, the polyimide has a crosslinked polyimide structure obtained by crosslinking of polyamide acid obtained by polymerization of tetracarboxylic dianhydride and diamine at a ratio of n+1:n. According to this, a procedure described in <<Production of porous polyimide>> below is easily adopted, and therefore the porous polyimide, which has low colorability and high light transmittability, is easily realized.

The polyimide main skeleton and the crosslinked structure may each have an aliphatic structure (including an alicyclic structure) or an aromatic structure, or a combination thereof.

The main skeleton of the polyimide constituting the porous polyimide preferably has a molecular chain represented by the following general formula (1):

[Chem. 2]

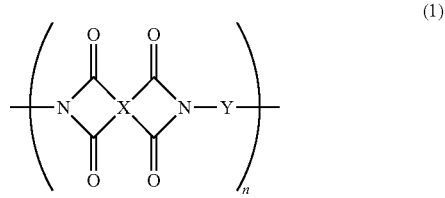

(1)

wherein X and Y are each a divalent organic group, and n is the degree of polymerization of the polyimide. In one aspect, X is a tetravalent organic group derived from tetracarboxylic dianhydride, Y is a divalent organic group derived from diamine, and n is a positive integer.

(Structure Containing Alicycle)

In one aspect, X and/or Y have/has a structure containing an alicycle (namely, cycloalkane structure, an alicyclic structure, or the like). The structure is small in intermolecular interaction as compared with, for example, an aromatic ring, and thus can suppress coloration caused due to large intermolecular interaction. While a polyimide obtained from an acid dianhydride having an aromatic ring (acid dianhydride containing no alicyclic structure) and a diamine having an aromatic ring (diamine containing no alicyclic structure) is easily colored yellow due to a structure having an aromatic ring, a porous polyimide according to one aspect can be reduced in proportion of a structure having an aromatic ring because of having a structure containing an alicycle, and thus can be inhibited from being colored yellow.

In one aspect, only X may have a structure containing an alicycle, only Y may have a structure containing an alicycle, or both X and Y may each have a structure containing an alicycle, in X and Y. When both X and Y each have a structure containing an alicycle, these "structures containing alicycles" may be the same as or different from each other. All the "structure containing an alicycle", "diamine having a structure containing an alicycle (alicyclic diamine)" and "structure containing an acid dianhydride having an alicycle (alicyclic acid dianhydride)" may each arbitrarily have an aromatic ring within the gist of the present invention. The "aromatic ring" arbitrarily contained optionally has a substituent, and the "alicycle" in the "structure containing an alicycle" also optionally has a substituent.

When the structure containing an alicycle is introduced to X, an acid dianhydride having the structure may be used to obtain a polyimide precursor (polyamic acid) and the precursor may be crosslinked and imidized. Specific examples of the acid dianhydride having the structure include
1,2,3,4-cyclobutane tetracarboxylic dianhydride (CBDA),
1,3-dimethyl-1,2,3,4-cyclobutane tetracarboxylic dianhydride,
1,2,3,4-tetramethyl-1,2,3,4-cyclobutane tetracarboxylic dianhydride,
4-(2,5-dioxotetrahydrofuran-3-yl)-1,2,3,4-tetrahydronaphthalene-1,2-dicarboxylic anhydride,
norbornane-2-spiro-2'-cyclopentanone-5'-spiro-2"-norbornane-5,5",6,6"-tetracarboxylic dianhydride (CpODA),
5-(2,5-dioxotetrahydrofuryl)-3-methyl-3-cyclohexene-1,2-dicarboxylic anhydride,
3-(carboxymethyl)-1,2,4-cyclopentanetricarboxylic acid 1,4:2,3-dianhydride (TCA),
bicyclo[2.2.2]oct-7-ene-2,3,5,6-tetracarboxylic dianhydride,
bicyclo[2.2.2]octane-2,3,5,6-tetracarboxylic acid 2,3:5,6-dianhydride,
cyclopentane tetracarboxylic dianhydride,
cyclohexane tetracarboxylic dianhydride,
meso-butane-1,2,3,4-tetracarboxylic dianhydride, and
1,1'-bicyclohexane-3,3',4,4'-tetracarboxylic acid-3,4:3',4'-dianhydride.

The acid dianhydride is preferably
1,2,3,4-cyclobutane tetracarboxylic dianhydride (CBDA),
norbornane-2-spiro-2'-cyclopentanone-5'-spiro-2"-norbornane-5,5",6,6"-tetracarboxylic dianhydride (CpODA), or
3-(carboxymethyl)-1,2,4-cyclopentanetricarboxylic acid 1,4:2,3-dianhydride (TCA), and is particularly preferably 1,2,3,4-cyclobutane tetracarboxylic dianhydride (CBDA) from the viewpoint of polymerization reactivity and from the viewpoint of physical strength of the resulting gel.

When the structure containing an alicycle is introduced to Y, a diamine having the structure may be used to obtain a polyimide precursor (polyamic acid) and the precursor may be crosslinked and imidized. Specific examples of the diamine having the structure include
1,4-cyclohexanediamine (CHDA),
1,3-cyclohexanediamine,
1,2-cyclohexanediamine,
1,4-bis(aminomethyl)cyclohexane,
1,3-bis(aminomethyl)cyclohexane,
bis(4-aminocyclohexyl) methane,
4,4'-methylenebis(2-methylcyclohexylamine),
3,3'-dimethyl-4,4'-diaminodicyclohexylmethane,
isophoronediamine, and
2,5-bis(aminomethyl) bicyclo[2.2.1]heptane.

In one aspect, in the polyimide constituting the porous polyimide,
the ratio of tetracarboxylic dianhydride containing an alicycle based on based on 100% by mass in total of tetracarboxylic dianhydride is 50% by mass or more and 100% by mass or less, and/or the ratio of diamine containing an alicycle based on 100% by mass in total of diamine is 50% by mass or more and 100% by mass or less. According to this, an increase in interaction between molecules is easily suppressed and thus a porous polyimide having low colorability and high light transmittability can be suitably obtained.

In one aspect, in the polyimide constituting the porous polyimide,
the ratio of tetracarboxylic dianhydride containing an aromatic ring based on 100% by mass in total of tetracarboxylic dianhydride is 0 or more and less than 50% by mass, or more than 0 and less than 50% by mass, and/or the ratio of diamine containing an aromatic ring based on 100% by mass in total of diamine is 0 or more and less than 50% by mass, or more than 0 and less than 50% by mass. According to this, coloration to yellow, as coloration which can be caused by a skeleton having an aromatic ring, is easily suppressed in the resulting polyimide and thus a porous polyimide having low colorability and high light transmittability can be suitably obtained.

X may have a structure imparting linearity or structure imparting bendability to a molecular chain of the resulting polyimide. X preferably has a structure imparting linearity to a molecular chain of the resulting polyimide. Herein, the "imparting linearity" to a molecular chain of the polyimide refers to having a structure where two single bonds connecting an objective monomer unit and two other monomer units adjacent thereto are arranged on a straight line. Herein, the "imparting bendability" to a molecular chain of the polyimide refers to having a structure where two single bonds connecting an objective monomer unit and two other monomer units adjacent thereto are not arranged on a straight line. X can have a structure imparting linearity to a molecular chain of the resulting polyimide to thereby control heat resistance of a porous polyimide sheet at a high level. Accordingly, X and/or Y can have the "structure containing an alicycle", and the "structure imparting linearity" and/or the "structure imparting bendability" to thereby allow the resulting polyimide to obtain contribution by the "structure containing an alicycle" and contribution by the "structure imparting linearity" and/or the "structure imparting bendability".

(Structure Imparting Linearity or Bendability)

X having the structure imparting linearity to a molecular chain of the polyimide is, for example, a substituted or unsubstituted tetravalent aromatic ring or polycyclic aromatic ring which is an aromatic ring or polycyclic aromatic ring having two acid anhydride groups at positions so that, when two acid anhydride groups form an imide bond with an amino group of diamine, two single bonds of the imide bond are arranged on a straight line. Examples of the aromatic ring or polycyclic aromatic ring in X include aromatic rings and fused aromatic rings, such as benzene, naphthalene, anthracene, phenanthrene, tetracene, triphenylene, chrysene and pyrene.

Examples of the tetracarboxylic dianhydride where X is an aromatic ring or polycyclic aromatic ring and has the structure imparting linearity to a molecular chain of the polyimide include compounds represented by the following general formulae;

[Chem. 3]

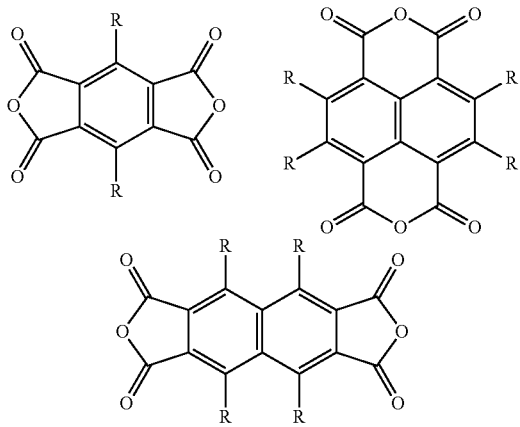

In the general formulae, each R may independently represent hydrogen, halogen, a hydroxyl group, or at least one organic group selected from the group consisting of an aryl group and an aliphatic hydrocarbon group. The aliphatic hydrocarbon group may be a branched or unbranched, saturated or unsaturated aliphatic hydrocarbon group.

Specific examples of the tetracarboxylic dianhydride having the structure imparting linearity to a molecular chain of the polyimide include pyromellitic dianhydride (PMDA), 1,4,5,8-naphthalene tetracarboxylic dianhydride (NTCDA), and 2,3,6,7-naphthalene tetracarboxylic dianhydride, and pyromellitic dianhydride (PMDA) is particularly preferable.

Specific examples of the tetracarboxylic dianhydride having the structure imparting bendability to a molecular chain of the polyimide include 3,3',4,4'-biphenyltetracarboxylic dianhydride (BPDA), 2,3,3',4'-biphenyltetracarboxylic dianhydride (α-BPDA), 3,3',4,4'-benzophenone tetracarboxylic dianhydride (BTDA), 4,4'-oxydiphthalic dianhydride (ODPA), 3,3',4,4'-biphenyl ether tetracarboxylic dianhydride, 2,3,3',4'-biphenyl ether tetracarboxylic dianhydride, 3,3',4,4'-biphenylsulfone tetracarboxylic dianhydride (DSDA), 2,2'-bis(3,4-dicarboxyphenyl) hexafluoropropanoic dianhydride, 2,2'-bis(3,4-dicarboxyphenyl) propanoic dianhydride, 1,2,4,5-cyclohexane tetracarboxylic dianhydride (HPMDA), 1,2,3,4-cyclopentane tetracarboxylic dianhydride (CPDA), 1,2,3,4-cyclobutane tetracarboxylic dianhydride (CBDA), 1-carboxymethyl-2,3,5-cyclopentanetricarboxylic acid-2,6:3,5-dianhydride (TCA-AH), 4,4'-(hexafluoroisopropylidene)diphthalic anhydride (6FDA), bicyclo[2.2.2]oct-7-ene-2,3,5,6-tetracarboxylic dianhydride (BTA), bicyclo[2,2,1]heptane-2,3,5,6-tetracarboxylic dianhydride (NBDAn), and 1,3,3a,4,5,9b-hexahydro-5-(tetrahydro-2,5-dioxo-3-furanyl)naphtho[1,2-c]furan-1,3-dione (TDA).

The tetracarboxylic dianhydride having the structure imparting bendability to a molecular chain of the polyimide more preferably has an aromatic group, and examples thereof include 3,3',4,4'-biphenyltetracarboxylic dianhydride (BPDA), 2,3,3',4'-biphenyltetracarboxylic dianhydride (α-BPDA), 3,3',4,4'-benzophenone tetracarboxylic dianhydride (BTDA), 4,4'-oxydiphthalic dianhydride (ODPA), 3,3', 4,4'-biphenyl ether tetracarboxylic dianhydride, 2,3,3',4'-biphenyl ether tetracarboxylic dianhydride, and 3,3',4,4'-biphenylsulfone tetracarboxylic dianhydride (DSDA). More preferred is 3,3',4,4'-biphenyltetracarboxylic dianhydride (BPDA).

Y may have a structure imparting linearity or structure imparting bendability to a molecular chain of the resulting polyimide. Y preferably has a structure imparting linearity to a molecular chain of the resulting polyimide. Y can have a structure imparting linearity to a molecular chain of the resulting polyimide to thereby control heat resistance of a porous polyimide sheet at a high level.

Y having the structure imparting linearity to a molecular chain of the polyimide is preferably, for example, a substituted or unsubstituted divalent aromatic ring or polycyclic aromatic ring which is an aromatic ring or polycyclic aromatic ring having two amino groups at positions so that, when two amino groups form an imide bond with an acid anhydride group of tetracarboxylic dianhydride, two single bonds of the imide bond are arranged on a straight line. Typically, positioning may be made where one amino group is located at the para-position relative to another amino group. Examples of the aromatic ring or polycyclic aromatic ring in Y include aromatic rings and fused aromatic rings, such as benzene, naphthalene, anthracene, phenanthrene, tetracene, triphenylene, chrysene and pyrene, and ring aggregates of aromatic rings bound via a single bond, such as biphenyl and triphenyl.

Examples of the diamine where Y is an aromatic ring or polycyclic aromatic ring and has the structure imparting linearity to a molecular chain of the polyimide include compounds represented by the following general formulae:

[Chem. 4]

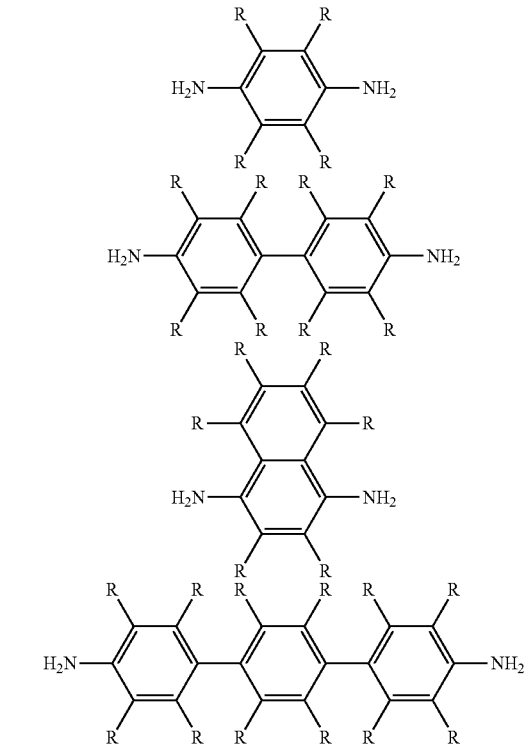

In the general formulae, each R may independently represent hydrogen, halogen, a hydroxyl group, or at least one organic group selected from the group consisting of an aryl group and an aliphatic hydrocarbon group. The aliphatic hydrocarbon group may be a branched or unbranched, saturated or unsaturated aliphatic hydrocarbon group.

Specific examples of the diamine having the structure imparting linearity to a molecular chain of the polyimide include p-phenylenediamine (PPDA), 2,5-dimethyl-p-phenylenediamine (DMPDA), 2,3,5,6-tetramethyl-p-phenylenediamine (TMPDA), 4,4'-diaminobiphenyl, 2,2'-dimethylbenzidine (DMBZ), 3,3'-dimethylbenzidine, 2,2'-bis(trifluoromethyl)benzidine (TFMB), 2,5-diaminotoluene, 2,5-dihydroxy-1,4-phenylenediamine, o-tolidine, 3,3'-dihydroxy-4,4'-diaminobiphenyl, and 3,3'-dimethoxy-4,4'-diaminobiphenyl. The diamine having the structure imparting linearity to a molecular chain of the polyimide is preferably at least one selected from the group consisting of p-phenylenediamine (PPDA), 2,5-dimethyl-p-phenylenediamine (DMPDA), 2,3,5,6-tetramethyl-p-phenylenediamine (TMPDA), 4,4'-diaminobiphenyl, 2,2'-dimethylbenzidine (DMBZ), 3,3'-dimethylbenzidine, and 2,2'-bis(trifluoromethyl)benzidine (TFMB).

Examples of the diamine having the structure imparting bendability to a molecular chain of the polyimide include compounds represented by the following general formulae:

[Chem. 5]

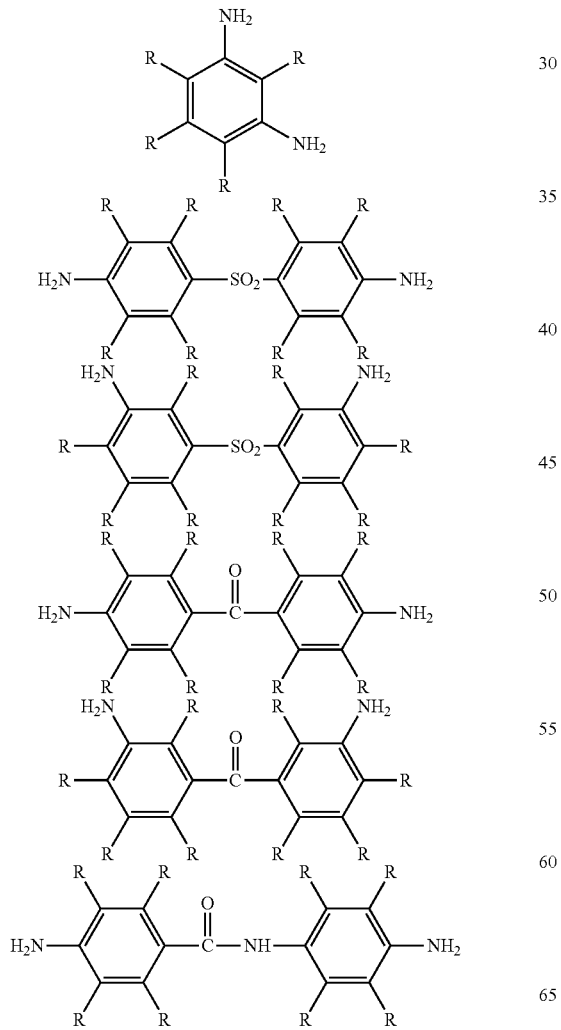

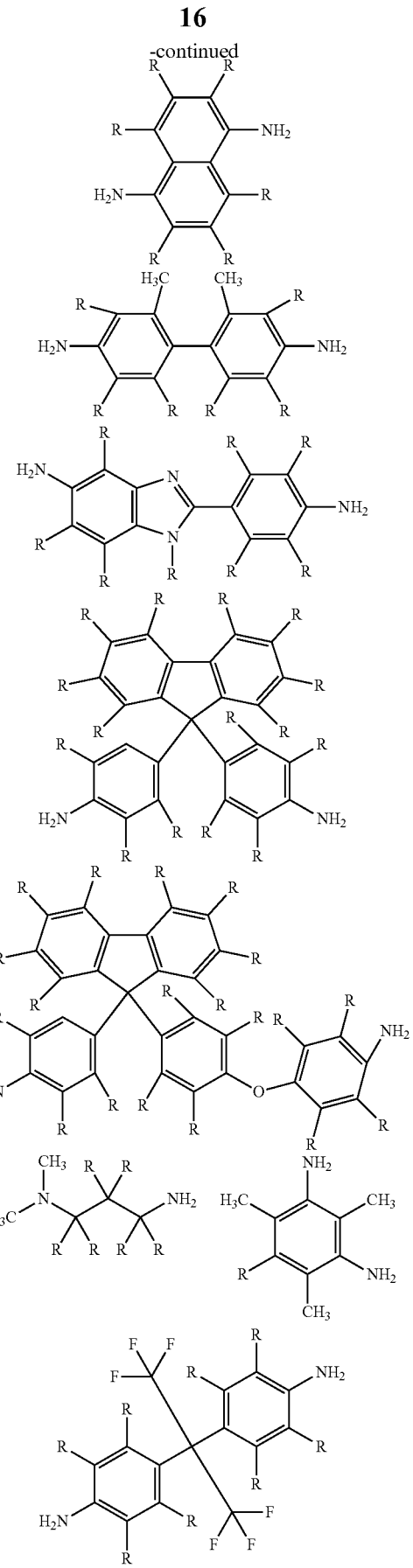

-continued

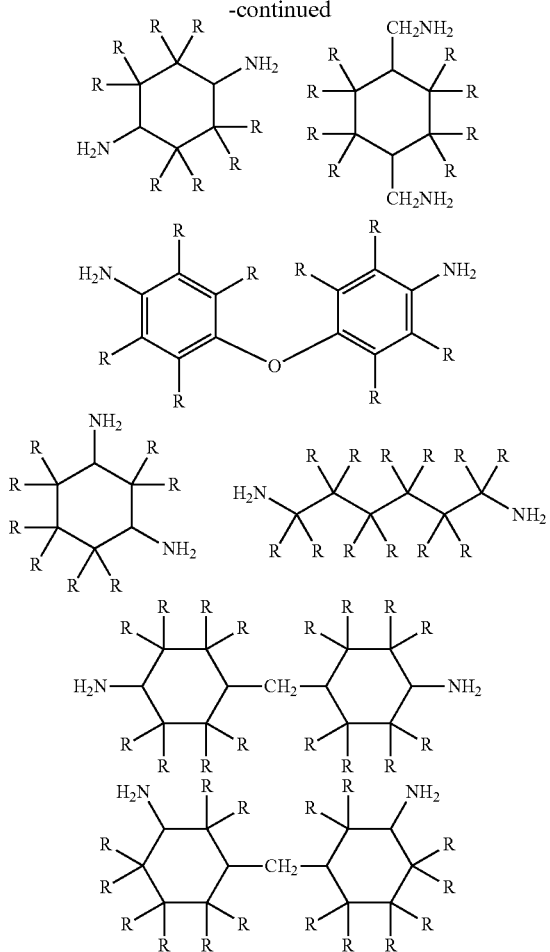

In the general formulae, each R may independently represent hydrogen, halogen, a hydroxyl group, or at least one organic group selected from the group consisting of an aryl group and an aliphatic hydrocarbon group. The aliphatic hydrocarbon group may be a branched or unbranched, saturated or unsaturated aliphatic hydrocarbon group.

Examples of the diamine having the structure imparting bendability to a molecular chain of the polyimide include aromatic diamines such as m-phenylenediamine (MPDA), 2,4-diaminotoluene, 2,4-diaminoxylene, 3,3'-diaminodiphenylsulfone (3DAS), 4,4'-diaminodiphenylsulfone (4DAS), 4,4'-diaminobenzophenone (4,4'-DABP), 3,3'-diaminobenzophenone (3,3'-DABP), 1,5-diaminonaphthalene (1,5-DAN), m-tolidine, 5-amino-2-(4-aminophenyl)-benzimidazole (ABI), 4,4'-diaminobenzanilide (DABA), 9,9-bis(4-aminophenyl) fluorene, 9,9-bis(4-aminophenoxyphenyl) fluorene, 2,4,6-trimethyl-1,3-phenylenediamine (TMPDA), 2,2-bis(4-aminophenyl) hexafluoropropane (6FDAm), and 4,4'-oxydianiline (ODA); and aliphatic diamines such as N,N-dimethyl-1,3-propanediamine (DMPDA), 1,4-cyclohexanediamine (trans-isomer, cis-isomer, or cis- and trans-mixture) (CHDA), 1,4-bisaminomethylcyclohexane (trans-isomer, cis-isomer, or cis- and trans-mixture) (14BAC), hexamethylenediamine, 1,3-diaminocyclohexane, 4,4'-diaminodicyclohexane, and 3,3'-diaminodicyclohexane.

Among such diamines having the structure imparting bendability, examples of the aromatic diamine preferably include 1,5-diaminonaphthalene (1,5-DAN).

(Crosslinked Structure)

The crosslinked structure is a tri- or higher-functional structure, and is, in one aspect, derived from a tri- or higher-functional crosslinking agent. The functional group of the crosslinking agent is a group having reactivity with an acid anhydride group or amino group as a terminal group of polyamide acid. Thus, the crosslinking agent has a function to form a polyamide acid gel by crosslinking of polyamide acids. The crosslinking agent is typically a tri- or higher-functional carboxylic acid or amine, more typically a tri- or higher-functional amine.

The crosslinking agent is, in one aspect, a compound represented by the following general formula (4):

$$Z—(R)_a \quad (4)$$

wherein Z is an a-valent organic group, each R independently an amino group or a carboxy group, and a is an integer of 3 or more.

Z in the general formula (4) contains, in one aspect, a substituted or unsubstituted aliphatic group or aromatic group, or a combination thereof. The aliphatic group may be a linear or cyclic, branched or non-branched, saturated or unsaturated aliphatic group. The aromatic group may be constituted from a carbocycle and/or a heterocycle.

The number of carbon atoms in Z is preferably 6 to 24, more preferably 6 to 18, further preferably 6 to 12.

All R's are, in one aspect, amino groups or carboxy groups, preferably amino groups.

a is, in one aspect, 3 or 4, preferably 3.

In one aspect, Z is a tri- or higher-valent group derived from a monocyclic or polycyclic aromatic ring optionally substituted (namely, formed by removal of three or more hydrogen atoms from such a ring), or a tri- or higher-valent group derived from a linked aromatic ring of a plurality of aromatic rings optionally substituted, by direct binding or by binding via a hetero atom (namely, formed by removal of three or more hydrogen atoms from such a ring). More specific examples of Z include a tri- or higher-valent group (in the present disclosure, also referred to as "entire aromatic group") formed by removal of three or more hydrogen atoms from a monocyclic or polycyclic aromatic ring optionally substituted, or a plurality of aromatic rings optionally substituted (for example, biphenyl), a tri- or higher-valent group (in the present disclosure, also referred to as "hetero skeleton-containing group") formed by removal of three or more hydrogen atoms from a plurality of aromatic rings optionally substituted (for example, benzophenone, diphenyl ether, diphenylsulfone, and benzanilide), bound to each other via a hetero atom, and a tri- or higher-valent group (in the present disclosure, also referred to as "aliphatic skeleton-containing group") having an aliphatic carbon atom in a molecular backbone. The molecular backbone of the crosslinking agent means a moiety involving in mutual binding of there or more functional groups present in the crosslinking agent. Examples of the substituent include an aliphatic or aromatic group, or a combination thereof. The number of carbon atoms in the substituent is preferably 4 or less.

Examples of the crosslinking agent where Z is the entire aromatic group include 1,3,5-tris(4-aminophenyl)benzene (TAB), 2,4,6-tris(4-aminophenyl)pyridine (TAPP), and 1,3,5-benzenetricarbonyl chloride (BTC).

Examples of the crosslinking agent where Z is the hetero skeleton-containing group include 1,3,5-tris(4-aminophenoxy)benzene.

Examples of the crosslinking agent where Z is the aliphatic skeleton-containing group include 4,4',4''-(methanetriyl)trisaniline and 4,4',4'',4'''-methanetetrayltetraaniline.

Z is preferably the entire aromatic group or the hetero skeleton-containing group, more preferably the entire aromatic group, from the viewpoint that a porous polyimide excellent in heat resistance is obtained.

The polyimide has, in one aspect, a structure represented by the following general formula (5):

[Chem. 6]

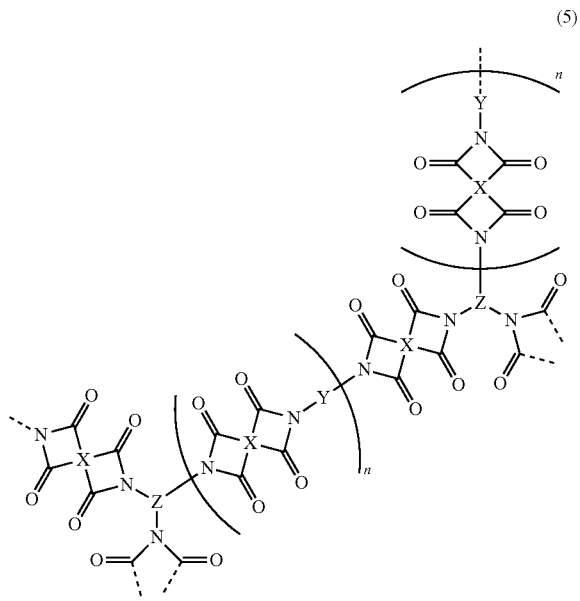

(5)

wherein X, Y and Z respectively have the same meanings as in X in the general formula (2), Y in the general formula (3) and Z in the general formula (4), and n is a positive integer.

n means the degree of polymerization of the polyimide, and may be preferably 3 or more, or 5 or more and may be preferably 40 or less, or 30 or less, or 20 or less.

Examples of the combination of the X, Y and Z structures, preferred from the viewpoint of heat resistance of the porous polyimide, include a combination where X is a simple aromatic group and Y and Z are each the entire aromatic group or hetero skeleton group, and a combination where X is a simple aromatic group or a bendable skeleton-containing group and Y and Z are each the entire aromatic group.

<Advantages of the Present Embodiment>

Hereinafter, advantages of the present embodiment over the prior art are described.

For example, the procedure described in PTL 3 has a difficulty in obtaining a polyimide aerogel having low colorability and high light transmittability as in the present embodiment.

It is also known that chemical imidization of polyamide acid with alicyclic acid dianhydride in the procedure described in PTL 3 is very slow as compared with chemical imidization of polyamide acid with an aromatic acid dianhydride monomer as described in PTLs 1 and 2, and NPLs 1 and 2 (Literature "Polyimide High Performance-Functionalization Designs for Corporate Engineers (Kigyogijutsusha notameno Polyimide Koseinoka-Kinoka Sekkei)", first edition and first print, issued on Dec. 25, 2020, Author: Kohei GOTO, Publication: Science & Technology Co., Ltd.). Accordingly, the procedure described in PTL 3 hardly obtains an alicyclic polyimide aerogel having a uniform structure.

<<Production of Porous Polyimide>>

The porous polyimide of the present disclosure can be produced by, in one aspect, a method including a polymerization step of polymerizing the acid dianhydride in the present disclosure and the diamine in the present disclosure to thereby obtain a polyamide acid, a gelation step of crosslinking the polyamide acid by the crosslinking agent in the present disclosure to thereby obtain a polyamide acid wet gel, an imidization step of imidizing the polyamide acid wet gel to thereby obtain a polyimide wet gel, and, a drying step of drying the polyimide wet gel to thereby obtain a polyimide aerogel.

A polyimide gel has been conventionally produced generally by a method including imidizing polyamide acid to thereby obtain polyimide and then allowing the polyimide to gelate. Such a method, because of causing easy aggregation of the polyimide during gelation, has a restriction on material selection, which requires selection of a polyimide having a molecular structure hardly leading to aggregation in order to stably obtain a polyimide aerogel having a desired pore structure. In particular, if rigidity of a molecular backbone of polyimide is high, polyimide aggregation easily occurs during gelation after imidization and a polyimide having a desired pore structure is difficult to produce. Furthermore, a polyimide gel obtained by gelation after imidization is poor in shape retainability during heating and tends to be remarkably deformed particularly under severe heating conditions as in carbonization, and thus is often unsuitable for production of porous carbon.

On the other hand, a method including subjecting polyamide acid to gelation and then imidization achieves the advantage of being capable of stably forming a desired pore structure without any restriction on a molecular structure of polyimide, by appropriate adjustment of gelation conditions. In particular, such a method can stably produce a polyimide aerogel having a desired pore structure even when rigidity of a molecular backbone of polyimide is high, and thus the benefit according to the method is particularly remarkably achieved when rigidity of a molecular backbone of polyimide is high polyimide. Such a method including subjecting polyamide acid to gelation and then imidization is particularly advantageous in that a porous polyimide having low colorability and high light transmittability is obtained when X and/or Y in the general formula (2) in the present disclosure have/has a structure containing an alicycle.

The polyamide acid composition of the present disclosure is, in one aspect, a polyamide acid composition that includes a resin precursor and a solvent and that is for obtaining a heat-resistant material low in coloration and high in light transmission, wherein a porous polyimide obtained by subjecting the polyamide acid composition to addition of a crosslinking agent and chemical imidization due to immersion in a solution in the listed order satisfies the following (1) to (2):

(1) an average pore size (L) obtained by the following expression based on a pore volume (V) and a BET specific surface area (A) determined by a gas adsorption method:

$$L = 4V/A$$

is 5 nm or more and 500 nm or less,
(2) a light transmittance at 450 nm at a film thickness of 1 mm is 10% or more, and
a degree of polymerization (n) of the polyimide is 5 or more and less than 40.

According to the polyamide acid composition of the present disclosure, the polyimide composition of the present disclosure, which satisfies the (1) and (2), can be suitably obtained. A polyamide acid composition according to one aspect is particularly suitable in an application where low colorability, high light transmittability, and heat resistance are demanded, for example, in an optical material (window glass or the like), a coating material and a covering material in a field where heat resistance is demanded, for example, the aeronautical field and the vehicle field. Alternatively, a polyamide acid composition according to one aspect is particularly suitable in an application where at least one characteristic selected from the group consisting of low colorability, high light transmittability, high electrical insulating properties, high sound insulating properties, high heat insulating properties, and high strength properties is demanded.

The polyamide acid composition of the present disclosure includes, in one aspect, a polyamide acid containing a structure derived from acid dianhydride and a structure derived from diamine, and a solvent. The polyamide acid composition may include a polymer other than the polyamide acid, for example, may include polyimide. The "polyamide acid" here mentioned means a polymer having a rate of imidization of less than 20%, namely, a polymer where most of repeating units each correspond to the following formula:

[Chem. 7]

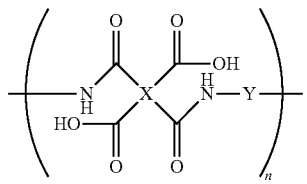

In the formula, X and Y are the same as described above, and n is positive integer. The polyamide acid is also referred to as "polyimide precursor" or "polyamic acid".

In a polyamide acid composition according to one aspect, the polyamide acid further has a structure derived from a crosslinking agent. The structure derived from a crosslinking agent, namely, a crosslinked structure is a structure with a tri- or higher-valent group derived from a monocyclic or polycyclic aromatic ring optionally substituted, or a tri- or higher-valent group derived from a linked aromatic ring where a plurality of aromatic rings optionally substituted are linked to each other by direct binding or by binding via a hetero atom.

Preferable configuration, characteristics, and the like in the case of the porous polyimide are again basically preferable in a polyamide acid composition according to one aspect.

Accordingly, in a porous polyimide obtained from a polyamide acid composition according to one aspect,
the respective ratios of the amounts of adsorption at relative pressures of 0.90, 0.85, 0.80, and 0.75 to the amount of adsorption at a relative pressure of 0.98 in a desorption curve in a nitrogen adsorption/desorption isotherm at 77 K may be 0.50 or more and 1.0 or less, 0.30 or more and 1.0 or less, 0.25 or more and 0.90 or less, and 0.20 or more and 0.85 or less, and
a structure where a polyamide acid obtained by polymerization of tetracarboxylic dianhydride and diamine at a ratio of n+1:n is crosslinked may be contained.

<Polymerization Step>

In the present step, the acid dianhydride and the diamine are polymerized in a polymerization solvent, and furthermore crosslinked by a crosslinking agent to thereby obtain a polyamide acid. A solvent having the ability to dissolve the polyamide acid can be used as the polymerization solvent, and an amide-based solvent, an ether-based solvent, an ester-based solvent, a ketone-based solvent, a phenol-based solvent, a sulfone-based solvent, and a sulfoxide-based solvent can be exemplified.

Examples of the amide-based solvent include N-methyl-2-pyrrolidone (NMP), N,N-dimethylformamide (DMF), and N,N-dimethylacetamide (DMAc).

Examples of the ester-based solvent include cyclic esters (for example, lactones such as γ-butyrolactone (GBL), δ-valerolactone, ε-caprolactone, γ-crotonolactone, γ-hexanolactone, α-methyl-γ-butyrolactone, γ-valerolactone, α-acetyl-γ-butyrolactone, and δ-hexanolactone), methyl acetate, ethyl acetate, butyl acetate, and dimethyl carbonate.

Examples of the ketone-based solvent include acetone, methyl ethyl ketone, methyl isobutyl ketone, cyclohexanone, and cyclopentanone.

Examples of the phenol-based solvent include m-cresol.

Examples of the sulfone-based solvent include methylsulfone, ethylphenylsulfone, diethylsulfone, diphenylsulfone, bisphenol S, solapsone, Dapsone, bisphenol A polysulfone, and sulfolane.

Examples of the sulfoxide-based solvent include dimethylsulfoxide (DMSO).

The boiling point of the solvent may be preferably 80° C. or more, or 100° C. or more, or 120° C. or more. Such a solvent having a high boiling point can decrease the rate of polymerization of the polyamide acid and the rate of gelation of the polyamide acid or polyimide, as compared with the rate of volatilization of the solvent, and thus can allow for, for example, polymerization and/or gelation around room temperature and is preferable in terms of process management. Such a high-boiling point solvent is preferably an amide-based solvent, more preferably at least one selected from the group consisting of N-methyl-2-pyrrolidone (NMP, boiling point 202° C.), N,N-dimethylformamide (DMF, boiling point 153° C.) and N,N-dimethylacetamide (DMAc, boiling point 165° C.), particularly preferably N-methyl-2-pyrrolidone (NMP).

The polymerization temperature, in one aspect, may be 10° C. or more and may be 80° C. or less, or 60° C. or less, or 40° C. or less. In a preferable aspect, the temperature may be kept throughout the polymerization step without cooling or heating of the polymerization solvent (namely, under an ambient environment).

<Gelation Step>

In the present step, the crosslinking agent in the present disclosure is added to a polyamide acid solution obtained in the polymerization step to thereby obtain a polyamide acid wet gel. The crosslinking agent may be added in a single form or as a solution in a solvent (in the present disclosure, also referred to as "crosslinking agent solvent"), to the polyamide acid solution. Suitable examples of the crosslinking agent solvent are the same as exemplified with respect to the above polymerization solvent, and the above high-boiling point solvent is particularly preferable. The high-boiling point solvent is low in rate of volatilization as compared with the rate of gelation, and thus, for example, stable gelation at a gelation temperature of 10° C. or more and/or without any cooling operation of the system can be made. The polymerization solvent and the crosslinking agent solvent may be the same as or different from each other, and are preferably the same as each other.

In one aspect, the mixture may be cast on a substrate and left to stand still to thereby allow gelation to progress. The thickness of the mixture may be selected depending on the thickness of an objective porous polyimide, and may be, in one aspect, 0.1 μm to 10 mm. The gelation atmosphere is not limited, and may be air, an inert gas (for example, nitrogen), or the like.

The gelation temperature is preferably 10° C. or more from the viewpoint of a shorter gelation time and thus an improvement in process efficiency, and is preferably 80° C. or less, or 60° C. or less, or 40° C. or less from the viewpoint of stable formation of a desired pore structure. In a preferable aspect, the temperature may be kept throughout the gelation step without cooling or heating of the solvent (namely, under an ambient environment).

The gelation time is preferably 1 minute or more, or 2 minutes or more from the viewpoint of stable formation of a desired pore structure, and is preferably 60 minutes or less, or 30 minutes or less, or 10 minutes or less from the viewpoint of process efficiency.

<Imidization Step>

In the present step, the polyamide acid wet gel obtained in the gelation step is imidized to thereby obtain a polyimide gel. In one aspect, a dehydrating imidization agent is used for imidization. The dehydrating imidization agent is not particularly limited as long as it can form an imide bond by dehydration cyclization of an amide bond of the polyamide acid wet gel and a carboxy group adjacent thereto. The dehydrating imidization agent is typically carboxylic anhydride, and may be used as a mixture thereof with an imidization promotor (amine or the like). Examples of the carboxylic anhydride include acetic anhydride, and examples of the amine include tertiary amines such as tiethylamine, and heterocyclic aromatic amines such as pyridine. In particular, a combination of acetic anhydride and tiethylamine, or a combination of acetic anhydride and pyridine is preferable.

In one aspect, imidization is performed by immersing the polyamide acid wet gel in an imidization liquid formed by dissolution of the dehydrating imidization agent and the imidization promotor in a solvent (in the present disclosure, also referred to as "immersion solvent"). The total concentration of the dehydrating imidization agent and the imidization promotor in 100% by mass of the imidization liquid is preferably 1% by mass or more, or 3% by mass or more from the viewpoint that imidization rapidly progresses, and is preferably 50% by mass or less, or 40% by mass or less, or 30% by mass or less, or 20% by mass or less from the viewpoint that the polyamide acid wet gel is suppressed in deformation to thereby obtain a polyimide gel where a pore structure of the polyamide acid wet gel is favorably retained.

Suitable examples of the immersion solvent are the same as exemplified with respect to the above polymerization solvent. The polymerization solvent and the crosslinking agent solvent may be the same as or different from each other, and are preferably the same as each other. The immersion solvent is preferably an amide-based solvent, more preferably at least one selected from the group consisting of NMP, DMF and DMAc, further preferably NMP.

The imidization temperature, for example, may be 10° C. or more and may be 80° C. or less, or 60° C. or less, or 40° C. or less. In a preferable aspect, the temperature may be kept throughout the imidization step without cooling or heating of the immersion solvent (namely, under an ambient environment).

As described above, a polyimide wet gel can be obtained. According to a method of one aspect, gelation is performed before imidization as described above, and thus a polyimide wet gel is obtained in which a polyamide acid composition suitably dispersed is chemically crosslinked and which has submicron-ordered dense pores. The method of one aspect is preferable because a polyimide wet gel is suitably obtained even by use of alicyclic diamine and/or alicyclic acid dianhydride.

<Drying Step>

In the present step, the polyimide wet gel obtained in the imidization step is dried to thereby obtain a polyimide aerogel. The drying method is preferably supercritical drying from the viewpoint that a polymer network structure of the polyimide wet gel is favorably maintained and a polyimide aerogel having a desired pore structure is stably obtained. Examples of the supercritical drying method can include a method including replacing the solvent contained in the polyimide wet gel with a ketone-based solvent such as acetone or a replacement solvent such as a lower alcohol, for example, ethanol, and furthermore replacing the replacement solvent with an inert gas such as carbon dioxide. A commercially available supercritical drying apparatus can be used in the supercritical drying.

Advantages of the Present Embodiment

In one aspect, the porous polyimide of the present disclosure can be produced, in the following one aspect, along with the flow (1) as illustrated in the FIGURE.

The state of the polymer in gelation, and the composition of the solvent may be focused in the present flow. In the present flow, the polyamide acid is basically crosslinked in a good solvent. Thus, phase separation hardly progresses. As a result, the resulting porous structure is dense and also is hardly suspended, and thus low colorability and high light transmittability are easily realized.

The flow (1) is shown in contrast with flows (2) and (3). One example of the contrast among the respective flows is as described below.

TABLE 1

|  | Flow (1) | Flow (2) | Flow (3) |
| --- | --- | --- | --- |
| Terminal/Crosslinking agent | Acid terminal/Triamine | Acid terminal/Triamine | Amine terminal/Acid chloride |
| Number of pots | Two pots, two stages | One pot, two stages | One pot, two stages |
| Main polymer in gelation | Polyamide acid | Polyimide | Polyimide |
| Solvent in gelation | Good solvent | Good solvent + Poor solvent (imidization agent) | Good solvent + Poor solvent (imidization agent) |
| Phase separation in gelation | Small | Large | Large |
| Gel | Easily realizing low colorability and high light transmittability | Easily opaque | Easily opaque |

EXAMPLES

Hereinafter, exemplary aspects of the present invention are further described with reference to Examples, but the present invention is not limited to these Examples at all.

<<Measurement and Evaluation Methods>

<Degree of Polymerization (n)>

The degree of polymerization (n) was adjusted based on the molar ratio between the diamine and the acid dianhydride in the polymerization step. In the present disclosure, the diamine:acid dianhydride (molar ratio) in the polymerization step was n:n+1 in Examples 1 to 4 and Comparative Examples 3 to 6. In Comparative Examples 1 and 2, the diamine:acid dianhydride (molar ratio) in the polymerization step was n+1:n.

<Measurement of Weight Average Molecular Weight>

The weight average molecular weight (Mw) was measured with gel permeation chromatography (GPC) under the following conditions. The solvent here used was N,N-dimethylformamide (for high-performance liquid chromatography, manufactured by FUJIFILM Wako Pure Chemical Corporation), and this solvent, to which 24.8 mmol/L of lithium bromide monohydrate (purity 99.5%, manufactured by FUJIFILM Wako Pure Chemical Corporation) and 63.2 mmol/L of phosphoric acid (for high-performance liquid chromatography, manufactured by FUJIFILM Wako Pure Chemical Corporation) were added before measurement, was used. The calibration curve for calculation of the weight average molecular weight was created with standard polystyrene (manufactured by Tosoh Corporation).

Column: Shodex KD-806M (manufactured by Showa Denko K.K.)
Flow rate: 1.0 mL/min
Column temperature: 40° C.
Pump: PU-2080 Plus (manufactured by JASCO Corporation)
Detector:
  RI-2031 Plus (RI: differential refractometer, manufactured by JASCO Corporation)
  UV-2075 Plus (UV-VIS: ultraviolet-visible spectrometer, manufactured by JASCO Corporation)

<Measurement of Average Pore Size and BET Specific Surface Area of Porous Polyimide>

About 0.2 g of a sample was placed in a glass sample tube, and vacuum deaeration with heating was performed in a sample pre-treatment apparatus under conditions of 50° C. and 0.001 mmHg or less for 18 hours. After vacuum deaeration with heating, the weight of the sample was measured, and used as the weight of the sample in calculation of the specific surface area. The specific surface area was calculated with the intercept and the slope of a line (BET plot) in a range of relative pressure (P/PO) of 0.05 or more and 0.30 or less, according to the BET equation, from a nitrogen gas adsorption isotherm under a temperature (77 K) of liquid nitrogen, by use of a multi-specimen high-performance specific surface area/pore distribution measuring apparatus (3Flex, manufactured by Micromeritics Corp). The pore volume was derived from the amount of adsorption at 760 mmHg, and the average pore size (L) was calculated by the relational expression of $L=4V/A$ with the pore volume (V) and the specific surface area(S). The pore distribution was calculated according to the BJH method.

<Pore Size Distribution of Porous Polyimide>

Evaluation was made according to the following rating, in a desorption curve of nitrogen (N2) adsorption/desorption isotherm at 77 K, obtained in measurement of the average pore size and the BET specific surface area of the porous polyimide.

A: all the following 1) to 4) satisfied.
B: three or two of the following 1) to 4) satisfied.
C: one of the following 1) to 4) satisfied, or none thereof satisfied.

1) a ratio of the amount of adsorption at a relative pressure of 0.90 to the amount of adsorption at a relative pressure of 0.98, of 0.50 or more and 1.0 or less
2) a ratio of the amount of adsorption at a relative pressure of 0.85 to the amount of adsorption at a relative pressure of 0.98, of 0.30 or more and 1.0 or less
3) a ratio of the amount of adsorption at a relative pressure of 0.80 to the amount of adsorption at a relative pressure of 0.98, of 0.25 or more and 0.90 or less
4) a ratio of the amount of adsorption at a relative pressure of 0.75 to the amount of adsorption at a relative pressure of 0.98, of 0.25 or more and 0.80 or less <Three-Point Bending Elastic Modulus and Three-Point Bending Strength of Porous Polyimide>

A sample of 30 mm width×14 mm depth×about 2 mm thickness (more specifically 2 mm), cut out from a disc-shaped porous polyimide dried, was subjected to a three-point bending test. Measurement conditions were as follows.

Tester: material tester, Model 5982, manufactured by Instron
Temperature: 23° C.
Testing speed: 1 mm/min
Supporting span: 20 mm <Strain at Break of Porous Polyimide>

A three-point bending test was performed under the same conditions as described above, and the porous polyimide was stretched until the porous polyimide was broken. The strain at which a test piece was broken (stress was sharply reduced) was defined as the strain at break. The strain was measured up to 15%, and the strain at break in the case of no breaking was assumed to be ">15% (more than 15%)".

<Measurement of Bulk Density of Porous Polyimide>

The weight, the radius, and the average thickness of a disc-shaped porous polyimide sample dried were respectively defined as m (g), r (cm), and h (cm), and the bulk density d (g/cm³) was calculated according to the following expression.

$$d = m/\pi h r^2$$

In the expression, the radius r was calculated as one-half the average value obtained by measurement of the diameter 2r with a caliper at 10 positions so that measurement intervals were almost even. The average thickness h was calculated as the average value obtained by measurement in a round surface at 20 positions so that measurement intervals were almost even. The average thickness h was used as the film thickness T (mm) in the following expression:

$$0 < (100 - LT)/T \leq 70$$

<Measurement of Light Transmittance of Porous Polyimide>

A sample of 30 mm width×30 mm depth×1 mm thickness, cut out from a disc-shaped porous polyimide dried, was subjected to light transmittance measurement. Measurement conditions were as follows. The wavelength range was the range from 300 to 800 nm in the measurement by itself, and the region from 400 to 750 nm was used in evaluation.

Tester: UV-2450 manufactured by Shimadzu Corporation
Wavelength range: 300 to 800 nm
Scan speed: low
Sampling pitch: 0.5 nm
Measurement mode: single
S/R switching: standard
Width of slit for transmittance: 5.0 nm
Light source switching wavelength: 320 nm
According to the light transmittance measurement,
1) the light transmittance at 450 nm,
2) the minimum value of the light transmittance between 400 nm and 700 nm,
3) the difference in light transmittance between the maximum value and the minimum value, between 400 nm and 700 nm, and
4) the average value of the light transmittance between 400 nm and 700 nm were determined. Herein, any example not satisfying the standards of 1) and 2) was not evaluated with respect to 3) and 4).

<Evaluation of Transparency of Porous Polyimide>

The transparency of the porous polyimide was evaluated according to the following procedure. In other words, a sample was placed on a paper surface where any one mark (character or symbol) of 10 mm square was written, so as to cover such one character. The mark was tried to be viewed from a location of about 30 cm away therefrom with the sample being interposed, and was evaluated according to the following evaluation. The evaluation was performed under usual indoor light. (Evaluation criteria)

A: confirmation of the presence of the mark was possible, and discrimination of the state of the mark was possible.
B: confirmation of the presence of the mark was possible, but discrimination of the state of the mark was not possible.
C: confirmation of the presence of the mark was not possible.

<<Production Example of Bulk-Shaped Porous Polyimide>>

Example 1

After N-methyl-2-pyrrolidone (NMP: 35.1 g) was added to p-phenylenediamine (PPDA: 1.08 g; 10.0 mmol) in a 100 mL glass vial and dissolution was made under stirring with a magnetic stirrer, a powder of 1,2,3,4-cyclobutane tetracarboxylic anhydride (CBDA: 2.09 g; 10.67 mmol) was added under stirring. The solution was stirred at room temperature (25° C.) until the molecular weight was not increased any more, and a polyamide acid (PAA) solution was thus obtained.

A solution of 1,3,5-tris(4-aminophenyl)benzene (TAB: 0.156 g; 0.444 mmol) dissolved in 3.1 g of NMP in a separate 10 mL glass vial was added to the polyamide acid (PAA) solution, and stirred for 1 minute. The resulting solution was transferred to a PFA template (Ø100 mm, depth 30 mm) so as to have a thickness of about 1 mm, and left to stand still at room temperature (25° C.) for about 30 minutes, and thus a polyamide acid wet gel (PAA-WG) having no fluidity was obtained.

The PAA-WG was left to stand still in a closed vessel made of SUS under an atmosphere saturated with NMP, at room temperature (25° C.) for 24 hours, thereafter taken out from the template and immersed in a mixed solution of acetic anhydride (26.1 g; 256 mmol), tiethylamine (TEA: 3.2 g; 32 mmol), and 264 g of NMP at room temperature (25° C.) for 24 hours, and a polyimide wet gel (PI-WG) was thus obtained.

The PI-WG was taken out from the solution, repeatedly subjected three times to immersion in a solution in acetone: NMP=1:1 (weight ratio) for 24 hours, thereafter washing with acetone, and further immersion in acetone for 24 hours acetone, and dried with a supercritical drying apparatus ("SCRD4" manufactured by Rexxam Co., Ltd.), and thus a porous polyimide (pPI) was obtained.

Examples 2 to 4

Each porous polyimide (pPI) was obtained by performing the same operations as in Example 1, in which the types and amounts of the diamine, tetracarboxylic anhydride, crosslinking agent, imidization reagents (dehydrating imidization agent and imidization promotor), and solvent in Example 1 were changed to those shown in the Tables.

Comparative Example 1

A porous polyimide pPI was produced according to the following procedure, with reference to NPL 1. After N-methyl-2-pyrrolidone (NMP: 44.4 g) was added to 4,4'-oxydianiline (ODA: 2.10 g; 10.5 mmol) in a 100 mL glass vial and dissolution was made under stirring with a magnetic stirrer, a powder of 3,3'4,4'-biphenyltetracarboxylic dianhydride (BPDA: 2.94 g; 10.0 mmol) was added, these were stirred at room temperature (25° C.) until the molecular weight was not increased any more, and a polyamide acid (PAA) solution was thus obtained.

Thereafter, acetic anhydride (8.2 g; 80 mmol) was added while the polyamide acid (PAA) solution was stirred, and these were stirred until uniformity was achieved. Furthermore, tiethylamine (1.0 g; 10 mmol) was added, these were stirred until uniformity was achieved, and thereafter further stirred at room temperature (25° C.) for 15 minutes, and thus a polyimide (PI) solution was obtained.

A solution of 1,3,5-benzenetricarbonyl chloride (BTC: 88 mg; 0.333 mmol) dissolved in 1.8 g of NMP in a separate 10 mL glass vial was added to the polyimide (PI) solution, and stirred at room temperature until uniformity was achieved. After stirring, the resulting solution was transferred to a PFA template (@100 mm, depth 30 mm) so as to have a thickness of about 1 mm, and left to stand still at room temperature for 30 minutes, and thus a polyimide wet gel (PI-WG) having no fluidity was obtained.

The PI-WG obtained was left to stand still in a closed vessel made of SUS under an atmosphere saturated with NMP, at room temperature (25° C.) for 24 hours, thereafter immersed in a solution in acetone:NMP (mass ratio)=25:75 for 24 hours, a solution in acetone:NMP (mass ratio)=50:50 for 24 hours, and a solution in acetone:NMP (mass ratio) =75:25 for 24 hours, and thereafter repeatedly washed with acetone and immersed in acetone for 24 hours three times, to thereby replace the solvent. The polyimide wet gel immersed in acetone was dried with a supercritical drying apparatus ("SCRD4" manufactured by Rexxam Co., Ltd.), and thus a porous polyimide (pPI) was obtained.

Comparative Example 2

A porous polyimide pPI was produced according to the following procedure, with reference to NPL 2. After 2,2'-dimethylbenzidine (m-Tolidine, DMBZ: 2.17 g; 10.2 mmol) was added to N-methyl-2-pyrrolidone (NMP: 43.9 g) in a 100 mL glass vial and dissolution was made under stirring with a magnetic stirrer, a powder of 4,4'-hexafluoroisopropylidene diphthalic anhydride (6FDA: 1.11 g; 2.5 mmol) was added in portions under stirring at room temperature over 10 minutes, and stirred until the powder was completely dissolved. Thereafter, a powder of pyromellitic anhydride (PMDA: 1.64 g; 7.5 mmol) was added to the solution, and stirred at room temperature (25° C.) for about 10 minutes until uniformity was achieved, and a polyamide acid (PAA) solution was thus obtained.

Thereafter, acetic anhydride (8.2 g; 80 mmol) was added while the polyamide acid (PAA) solution was stirred, and these were stirred until uniformity was achieved. Furthermore, tiethylamine (1.0 g; 10 mmol) was added, these were stirred until uniformity was achieved, and thereafter further stirred at room temperature (25° C.) for 10 minutes, and thus a polyimide (PI) solution was obtained.

A solution of 1,3,5-benzenetricarbonyl chloride (BTC: 35 mg; 0.133 mmol) dissolved in 0.7 g of NMP in a separate 10 mL glass vial was added to the polyimide (PI) solution, and stirred at room temperature until uniformity was achieved. After stirring, the resulting solution was transferred to a PFA template (@100 mm, depth 30 mm) so as to have a thickness of about 1 mm, and left to stand still at room temperature for about 120 minutes, and thus a polyimide wet gel (PI-WG) having no fluidity was obtained.

Subsequently, the same solvent replacement and supercritical drying as in Comparative Example 1 were performed, and thus a porous polyimide (pPI) was obtained.

Comparative Example 3

A porous polyimide pPI was produced according to the following procedure, with reference to NPL 3. After N-methyl-2-pyrrolidone (NMP: 25.0 g) was added to 2,2'-bis(trifluoromethyl)-4,4'-benzidine (TFMB: 1.975; 6.16 mmol) in a 100-mL glass vial and dissolution was made under stirring with a magnetic stirrer, a powder of 1,2,3,4-cyclobutane tetracarboxylic anhydride (CBDA: 1.248 g; 6.36 mmol) was added and furthermore N-methyl-2-pyrrolidone (NMP: 25.0 g) was loaded and these were stirred at room temperature (25° C.) for about 12 hours until the molecular weight was not increased any more, and a polyamide acid (PAA) solution was thus obtained.

Thereafter, while the polyamide acid (PAA) solution was stirred, a powder of octa (aminophenoxy) silsesquioxane (OAPS: 58 mg; 0.050 mmol) was added. After stirring at room temperature for about 12 hours, acetic anhydride (3.2 g; 31.6 mmol) was added and stirred until uniformity was achieved, subsequently pyridine (2.5 g; 31.6 mmol) was added, and these were stirred until uniformity was achieved, and further stirred at room temperature for 30 minutes.

The solution was transferred to a PFA template (@100 mm, depth 30 mm) so as to have a thickness of about 1 mm, and left to stand still at room temperature for about 120 minutes, and thus a polyimide wet gel (PI-WG) having no fluidity was obtained. The polyimide wet gel (PI-WG) obtained was white and suspended.

Subsequently, the same solvent replacement and supercritical drying as in Comparative Example 1 were performed, and thus a porous polyimide (pPI) was obtained.

Comparative Example 4

A porous polyimide pPI was produced according to the following procedure, with reference to PTL 3. 2,2'-Dimethylbenzidine (m-Tolidine, DMBZ: 2.17 g; 10.2 mmol) was added to N-methyl-2-pyrrolidone (NMP: 47.2 g) in a 100 mL glass vial and dissolution was under stirring with a magnetic stirrer. A powder of 1,2,3,4-cyclobutane tetracarboxylic anhydride (CBDA: 1.96 g; 10.0 mmol) was added under stirring at room temperature, and stirred at room temperature (25° C.) for 4 hours, and a polyamide acid (PAA) solution was thus obtained.

Thereafter, acetic anhydride (8.2 g; 80 mmol) was added while the polyamide acid (PAA) solution was stirred, and these were stirred until uniformity was achieved. Furthermore, tiethylamine (1.0 g; 10 mmol) was added, and these were stirred until uniformity was achieved, and thereafter further stirred at room temperature (25° C.) for 15 minutes.

Furthermore, a solution of 1,3,5-benzenetricarbonyl chloride (BTC: 35 mg; 0.133 mmol) dissolved in 0.7 g of NMP in a separate 10 mL glass vial was mildly added to this solution. As a result, gelation rapidly progressed in the vicinity of the solution of BTC in NMP and an uneven system was obtained where a gel having a droplet shape and the solution were mixed and present in the solution, and thus no uniform gel could be obtained.

Comparative Example 4A

The results in Comparative Example 4 were considered to be due to a remarkably lower rate of chemical imidization of the polyamide acid with the alicyclic acid dianhydride than the rate of chemical imidization of the polyamide acid with the aromatic acid dianhydride.

In other words, it was considered that, in the case of use of a method (Comparative Example 4A) with reference to Examples of PTL 3, a crosslinking agent was mixed in the state where conversion from polyamide acid to polyimide was not sufficient. In this case, it was considered that a carboxylic acid moiety of the polyamide acid was rapidly reacted with the crosslinking agent, thereby resulting in rapid progression of gelation in the vicinity of a droplet of a solution including the crosslinking agent.

Comparative Example 5

A bulk-shaped porous polyimide pPIr4 was produced according to the following procedure, with reference to NPL 4. A porous polyimide pPI was produced according to the following procedure. N-methyl-2-pyrrolidone (NMP: 45.4 g) was added to 2,2'-dimethylbenzidine (m-Tolidine, DMBZ: 2.12 g; 10.0 mmol) in a 100 mL glass vial and dissolution was made under stirring with a magnetic stirrer. A powder of 3,3'4,4'-biphenyltetracarboxylic dianhydride (BPDA: 3.09 g; 10.5 mmol) was added under stirring of the solution, and stirred at room temperature for 2 hours.

Thereafter, while the solution was stirred, a solution of 1,3,5-tris(4-aminophenoxy)benzene (TAPB: 0.133 g; 0.333 mmol) dissolved in 2.7 g of NMP in a separate 20 mL glass vial was added, and these were stirred at room temperature for 10 minutes. Furthermore, acetic anhydride (8.6 g; 84 mmol) and pyridine (6.6 g; 84 mmol) were added, and stirred until uniformity was achieved.

The solution was transferred to a PFA template (@100 mm, depth 30 mm) so as to have a thickness of about 1 mm, and left to stand still at room temperature for about 30 minutes, and thus a polyimide wet gel (PI-WG) having no fluidity was obtained. The polyimide wet gel (PI-WG) obtained was yellow and suspended.

Subsequently, the same solvent replacement and supercritical drying as in Comparative Example 1 were performed, and thus a porous polyimide (pPI) was obtained.

Comparative Example 6

A porous polyimide pPI was produced according to the following procedure, with reference to PTL 3 and NPL 4.

N-Methyl-2-pyrrolidone (NMP: 46.9 g) was added to 2,2'-dimethylbenzidine (m-Tolidine, DMBZ: 2.12 g; 10.0 mmol) in a 100 mL glass vial and dissolution was made under stirring with a magnetic stirrer. A powder of 1,2,3,4-cyclobutane tetracarboxylic anhydride (CBDA: 2.06 g; 10.5 mmol) was added under stirring at room temperature, and stirred at room temperature (25° C.) for 4 hours, and a polyamide acid (PAA) solution was thus obtained.

Thereafter, while the polyamide acid (PAA) solution was stirred, a solution of 1,3,5-tris(4-aminophenoxy)benzene (TAPB: 0.133 g; 0.333 mmol) dissolved in 2.7 g of NMP in a separate 20-mL glass vial was added, these were stirred at room temperature for 10 minutes and thereafter acetic anhydride (8.6 g; 84 mmol) and pyridine (6.6 g; 84 mmol) were added thereto, and these were stirred for 5 minutes until uniformity was achieved.

The solution was transferred to a PFA template (@100 mm, depth 30 mm) so as to have a thickness of about 1 mm, and left to stand still at room temperature for about 300 minutes, and thus a polyimide wet gel (PI-WG) having no fluidity was obtained. The polyimide wet gel (PI-WG) obtained was white and suspended.

Subsequently, the same solvent replacement and supercritical drying as in Comparative Example 1 were performed, and thus a porous polyimide (pPI) was obtained.

[Table 2]

TABLE 2

|  |  | Example 1 | Example 2 | Example 3 | Example 4 |
|---|---|---|---|---|---|
| Diamine |  | PPDA | DMBZ | PPDA | DMBZ |
| MW | (g/mol) | 108.14 | 212.3 | 108.14 | 212.3 |
| Anhydride |  | CBDA | CBDA | CBDA | CBDA |
| MW | (g/mol) | 196.11 | 196.11 | 196.11 | 196.11 |
| Crosslinking agent |  | TAB | TAB | TAB | TAB |
| MW | (g/mol) | 351.45 | 351.45 | 351.45 | 351.45 |
| Degree of polymerization n | — | 15 | 15 | 10 | 10 |
| Solid content NV | (% by weight) | 8 | 8 | 7 | 7 |
| Solvent |  | NMP | NMP | NMP | NMP |
| Dehydrating imidization agent |  | Acetic anhydride | Acetic anhydride | Acetic anhydride | Acetic anhydride |
| Imidization promotor |  | TEA | TEA | TEA | TEA |
| Diamine | (g) | 1.08 | 2.12 | 1.08 | 2.12 |
|  | (mmol) | 10.0 | 10.0 | 10.0 | 10.0 |
| Anhydride | (g) | 2.09 | 2.09 | 2.16 | 2.16 |
|  | (mmol) | 10.67 | 10.67 | 11 | 11 |
| Crosslinking agent | (g) | 0.156 | 0.156 | 0.234 | 0.234 |
|  | (mmol) | 0.444 | 0.444 | 0.667 | 0.667 |
| Polymerization solvent | (g) | 35.1 | 47.1 | 41.5 | 55.3 |
| Crosslinking agent solvent | (g) | 3.1 | 3.1 | 4.7 | 4.7 |
| Dehydrating imidization agent | (g) | 26.1 | 26.1 | 27 | 27 |
|  | (mmol) | 256 | 256 | 264 | 264 |
| Imidization promotor | (g) | 3.2 | 3.2 | 3.3 | 3.3 |
|  | (mmol) | 32 | 32 | 33 | 33 |
| Immersion solvent | (g) | 264 | 264 | 273 | 273 |
| Gelation time | (min) | 45 | 30 | 50 | 40 |
| Average pore size | (nm) | 7.8 | 8 | 7.3 | 7.5 |
| BET specific surface area | (m$^2$/g) | 439 | 450 | 408 | 421 |
| Bulk density | (g/cm$^3$) | 0.24 | 0.22 | 0.23 | 0.22 |
| Bending elastic modulus | (MPa) | 558 | 426 | 521 | 404 |
| Bending strength | (MPa) | 18.2 | 16.3 | 16.6 | 15.4 |
| Strain at break | (%) | >15 | >15 | >15 | >15 |
| Pore size distribution | — | A | A | A | A |
| Transparency | — | A | A | A | A |
| Light transmittance at 450 nm | (%) | 65 | 70 | 66 | 68 |
| Minimum value of light transmittance at 400 to 700 nm | (%) | 53 | 58 | 54 | 56 |
| Difference in light transmittance at 400 to 700 nm | (%) | 30 | 28 | 31 | 30 |
| Average light transmittance at 400 to 700 nm | (%) | 68 | 78 | 70 | 77 |
| (100-light transmittance at 450 nm)/film thickness | (%/nm) | 35 | 30 | 34 | 32 |

[Table 3]

TABLE 3

| | | Comparative Example 1 | Comparative Example 2 | Comparative Example 3 | Comparative Example 4 | Comparative Example 5 | Comparative Example 6 |
|---|---|---|---|---|---|---|---|
| Diamine | | ODA | DMBZ | TFMB | DMBZ | DMBZ | DMBZ |
| MW | (g/mol) | 200.24 | 212.3 | 320.23 | 212.3 | 212.3 | 212.3 |
| Anhydride | | BPDA | PMDA/6FDA | CBDA | CBDA | BPDA | CBDA |
| MW | (g/mol) | 294.22 | 218.12/444.24 | 196.11 | 196.11 | 294.22 | 196.11 |
| Crosslinking agent | | BTC | BTC | OAPS | BTC | TAPB | TAPB |
| MW | (g/mol) | 265.47 | 265.47 | 1153.63 | 265.47 | 399.45 | 399.45 |
| Degree of polymerization n | — | 20 | 50 | 30 | 50 | 20 | 20 |
| Solid content NV | (% by weight) | 10 | 10 | 7 | 8 | 10 | 8 |
| Polymerization solvent | | NMP | NMP | NMP | NMP | NMP | NMP |
| Dehydrating imidization agent | | Acetic anhydride | Acetic anhydride | Acetic anhydride | Acetic anhydride | Acetic anhydride | Acetic anhydride |
| Imidization promotor | | TEA | TEA | Pyridine | TEA | Pyridine | Pyridine |
| Immersion solvent | | — | — | — | — | — | — |
| Diamine | (g) | 2.10 | 2.17 | 1.975 | 2.17 | 2.12 | 2.12 |
| | (mmol) | 10.5 | 10.2 | 6.16 | 10.2 | 10.0 | 10.0 |
| Anhydride | (g) | 2.94 | 1.64/1.11 | 1.248 | 1.96 | 3.09 | 2.06 |
| | (mmol) | 10.0 | 7.5/2.5 | 6.36 | 10.0 | 10.5 | 10.5 |
| Crosslinking agent | (g) | 0.088 | 0.035 | 0.058 | 0.035 | 0.133 | 0.133 |
| | (mmol) | 0.333 | 0.133 | 0.050 | 0.133 | 0.333 | 0.333 |
| Polymerization solvent | (g) | 44.4 | 43.9 | 50 | 47.2 | 45.4 | 46.9 |
| Crosslinking agent solvent | (g) | 1.8 | 0.7 | 0 | 0.7 | 2.7 | 2.7 |
| Dehydrating imidization agent | (g) | 8.2 | 8.2 | 3.2 | 8.2 | 8.6 | 8.6 |
| | (mmol) | 80 | 80 | 31.6 | 80 | 84 | 84 |
| Imidization promotor | (g) | 1.0 | 1.0 | 2.5 | 1.0 | 6.6 | 6.6 |
| | (mmol) | 10 | 10 | 31.6 | 10 | 84 | 84 |
| Immersion solvent | (g) | 0 | 0 | 0 | 0 | 0 | 0 |
| Gelation time | (min) | 20 | 120 | 120 | — | 30 | 180 |
| Average pore size | (nm) | 13.2 | 13.5 | 33 | — | 13.1 | 15.4 |
| BET specific surface area | (m²/g) | 390 | 770 | 410 | — | 340 | 380 |
| Bulk density | (g/cm³) | 0.15 | 0.17 | 0.23 | — | 0.18 | 0.25 |
| Bending elastic modulus | (MPa) | 45 | 99 | 23 | — | 55 | 43 |
| Bending strength | (MPa) | 0.9 | 2.9 | 0.5 | — | 1.5 | 3.3 |
| Strain at break | (%) | 1.9 | 3.5 | 1.2 | — | 2.6 | 2.6 |
| Appearance of wet gel | — | Colored opaque | Colored transparent | Colorless opaque | — | Colored opaque | Colorless opaque |
| Appearance of aerogel | | Colored opaque | Colored transparent | Colorless opaque | — | Colored opaque | Colorless opaque |
| Pore size distribution | — | B | C | B | — | B | C |
| Transparency | — | C | A | C | — | C | C |
| Light transmittance at 450 nm | (%) | <1 | <1 | <1 | — | <1 | <1 |
| Minimum value of light transmittance at 400 to 700 nm | (%) | <1 | <1 | <1 | — | <1 | <1 |
| Difference in light transmittance at 400 to 700 nm | (%) | — | — | — | — | — | — |
| Average light transmittance at 400 to 700 nm | (% · nm) | — | — | — | — | — | — |
| (100-light transmittance at 450 nm)/film thickness | (%/nm) | — | — | — | — | — | — |

INDUSTRIAL APPLICABILITY

The porous polyimide of the present disclosure can be suitably applied to various applications including applications of heat-resistant materials, in particular, heat-resistant materials in the field where low colorability and high light transmittability are demanded, and applications of materials for porous carbon sheet production.

The invention claimed is:

1. A porous polyimide composition, wherein
an average pore size (L) obtained by the following expression based on a pore volume (V) and a BET specific surface area (A) determined by a gas adsorption method:

$$L = 4V/A$$

is 5 nm or more and 500 nm or less,
a light transmittance at 450 nm at a film thickness of 1 mm is 10% or more and 100% or less, and
a degree of polymerization (n) is 5 or more and less than 40,
wherein a polyimide constituting the porous polyimide composition has a polyimide main skeleton and a crosslinked structure that crosslinks the polyimide main skeleton, and
wherein the polyimide main skeleton has a molecular chain represented by the following general formula (1):

[Chem. 1]

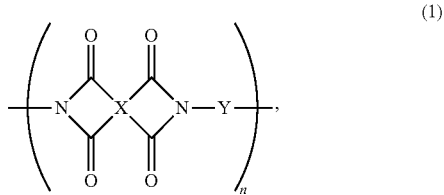

(1)

wherein X and/or Y have/has a structure containing an alicycle, and n is a degree of polymerization of the polyimide.

2. The porous polyimide composition according to claim 1, wherein
respective ratios of amounts of adsorption at relative pressures of 0.90, 0.85, 0.80, and 0.75 to an amount of adsorption at a relative pressure of 0.98 in a desorption curve in a nitrogen adsorption/desorption isotherm at 77 K are 0.50 or more and 1.0 or less, 0.30 or more and 1.0 or less, 0.25 or more and 0.90 or less, and 0.20 or more and 0.85 or less.

3. The porous polyimide composition according to claim 1, having a crosslinked polyimide structure obtained by crosslinking of polyamide acid obtained by polymerization of tetracarboxylic dianhydride and diamine at a ratio of n+1:n.

4. The porous polyimide composition according to claim 1, wherein a minimum value of a light transmittance between 400 nm and 700 nm at a film thickness of 1 mm is 5% or more.

5. The porous polyimide composition according to claim 1, wherein a difference between a maximum value and a minimum value of a light transmittance between 400 nm and 700 nm at a film thickness of 1 mm is 1% or more and 80% or less.

6. The porous polyimide composition according to claim 1, wherein an average value of a light transmittance between 400 nm and 700 nm at a film thickness of 1 mm is 30% or more and 100% or less.

7. The porous polyimide composition according to claim 1, wherein a bulk density is 0.05 g/cm$^3$ or more and 0.50 g/cm$^3$ or less.

8. The porous polyimide composition according to claim 1, wherein a strain at break in a three-point bending test is 5% or more.

9. The porous polyimide composition according to claim 1, wherein a bending strength in a three-point bending test is 5 MPa or more.

10. The porous polyimide composition according to claim 1, wherein a bending elastic modulus in a three-point bending test is 50 MPa or more.

11. The porous polyimide composition according to claim 1, wherein a BET specific surface area after heat treatment at 200° C. for 1 hour is 10 m$^2$/g or more and 2,000 m$^2$/g or less.

12. The porous polyimide composition according to claim 1, having a sheet shape.

13. The porous polyimide composition according to claim 12, wherein an average thickness is 10 mm or less.

14. The porous polyimide composition according to claim 1, wherein, when a light transmittance at 450 nm is defined as LT [%] and a thickness is defined as T [mm], a relationship represented by the following expression:

$$0<(100-LT)/T \leq 70$$

is satisfied.

15. The porous polyimide composition according to claim 1, wherein the crosslinked structure is a structure with a tri- or higher-valent group derived from a monocyclic or polycyclic aromatic ring optionally substituted, or a tri- or higher-valent group derived from a linked aromatic ring where a plurality of aromatic rings optionally substituted are linked to each other by direct binding or by binding via a hetero atom.

16. The porous polyimide composition according to claim 1, wherein
a polyimide constituting the porous polyimide composition comprises a polymerization product of a polymerization component comprising a tetracarboxylic dianhydride, a diamine, and a tri- or higher-functional amine, and
a ratio of the tri- or higher-functional amine based on 100% by mass in total of the tetracarboxylic dianhydride, the diamine and the tri- or higher-functional amine is 1% by mass or more and 40% by mass or less.

17. The porous polyimide composition according to claim 1, comprising a polymerization product of a polymerization component comprising a tetracarboxylic dianhydride, a diamine, and a tri- or higher-functional amine, in a polyimide constituting the porous polyimide composition, wherein
a ratio of the tetracarboxylic dianhydride, including an aromatic ring, based on 100% by mass in total of the tetracarboxylic dianhydride is less than 50% by mass, and/or
a ratio of the diamine, including an aromatic ring, based on 100% by mass in total of the diamine is less than 50% by mass.

18. The porous polyimide composition according to claim 1, for use in a heat-resistant material low in coloration and high in light transmission.

19. A polyamide acid composition that comprises a resin precursor and a solvent and that is for obtaining a heat-resistant material low in coloration and high in light transmission, wherein
a porous polyimide composition obtained by subjecting the polyamide acid composition to addition of a crosslinking agent and chemical imidization due to immersion in a solution in the listed order satisfies the following (1) to (2):
(1) an average pore size (L) obtained by the following expression based on a pore volume (V) and a BET specific surface area (A) determined by a gas adsorption method:

$$L=4V/A$$

is 5 nm or more and 500 nm or less,
(2) a light transmittance at 450 nm at a film thickness of 1 mm is 10% or more, and a degree of polymerization (n) of the polyimide is 5 or more and less than 40, wherein a polyimide constituting the porous polyimide composition has a polyimide main skeleton and a crosslinked structure that crosslinks the polyimide main skeleton, and wherein the polyimide main skeleton has a molecular chain represented by the following general formula (1):

[Chem. 1]

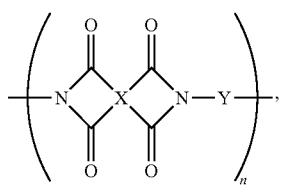

(1)

wherein X and/or Y have/has a structure containing an alicycle, and n is a degree of polymerization of the polyimide.

20. The porous polyimide composition according to claim 1, wherein X and/or Y have/has a structure imparting linearity to a molecular chain of the resulting polyimide.

21. The porous polyimide composition according to claim 20, wherein X is a substituted or unsubstituted tetravalent aromatic ring or polycyclic aromatic ring which is an aromatic ring or polycyclic aromatic ring having two acid anhydride groups at positions so that, when two acid anhydride groups form an imide bond with an amino group of diamine, two single bonds of the imide bond are arranged on a straight line.

22. The porous polyimide composition according to claim 20, wherein Y is a substituted or unsubstituted divalent aromatic ring or polycyclic aromatic ring which is an aromatic ring or polycyclic aromatic ring having two amino groups at positions so that, when two amino groups form an imide bond with an acid anhydride group of tetracarboxylic dianhydride, two single bonds of the imide bond are arranged on a straight line.

* * * * *